(12) United States Patent
Leung

(10) Patent No.: US 7,518,350 B2
(45) Date of Patent: Apr. 14, 2009

(54) MCU/DRIVER POINT OF LOAD DIGITAL CONTROLLER WITH OPTIMIZED VOLTAGE

(75) Inventor: Ka Y. Leung, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 433 days.

(21) Appl. No.: 11/303,515

(22) Filed: Dec. 16, 2005

(65) Prior Publication Data

US 2007/0139973 A1   Jun. 21, 2007

(51) Int. Cl.
G05F 1/40 (2006.01)
G05F 1/10 (2006.01)

(52) U.S. Cl. .................................. 323/283; 323/241

(58) Field of Classification Search ............... 323/241, 323/268, 271, 282, 283, 285; 363/17, 98, 363/131; 341/126, 131
See application file for complete search history.

(56) References Cited

U.S. PATENT DOCUMENTS

| | | | | |
|---|---|---|---|---|
| 6,005,377 | A * | 12/1999 | Chen et al. | 323/283 |
| 6,169,680 | B1 * | 1/2001 | Matsui et al. | 363/21.05 |
| 7,042,201 | B2 * | 5/2006 | Alfano et al. | 323/283 |
| 7,233,504 | B2 * | 6/2007 | Djenguerian et al. | 363/21.13 |
| 7,408,790 | B2 * | 8/2008 | Hansson et al. | 363/16 |

* cited by examiner

Primary Examiner—Matthew V Nguyen
(74) Attorney, Agent, or Firm—Howison & Arnott, LLP

(57) ABSTRACT

A system for optimizing the power efficiency of a switching power converter operating at a switching frequency includes a digital controller for receiving an analog signal representing an output DC voltage of the switching power converter for comparison to a desired output voltage level and generating switching control signals to control the operation of the power supply to regulate the output DC voltage to the desired output voltage level. At least two of the switching control signals have a dead time between a first edge of a first control signal and a second edge of a second control signal. The dead time is programmable to control a power efficiency of the switching power converter. The switching control signals additionally switch the power supply between a continuous conduction mode and a discontinuous conduction mode responsive to a mode control signal. The operation of the digital controller is parameterized by a set of operating parameters. A driver circuit is connected to an output of the digital controller to drive the switching control signals and further includes an input for a regulated voltage. The voltage regulator selects the regulated voltage to the driver circuit responsive to a voltage control signal. A micro controller determines the parameters used by the digital controller, establishes the programmable dead time between the control signals to substantially maximize power efficiency of the switching power converter, generates a voltage control signal to substantially maximize the power efficiency of the switching power converter and generates the mode control signal responsive to a current signal from the switching power converter. The micro controller operates independently of the operation of the digital controller.

8 Claims, 20 Drawing Sheets

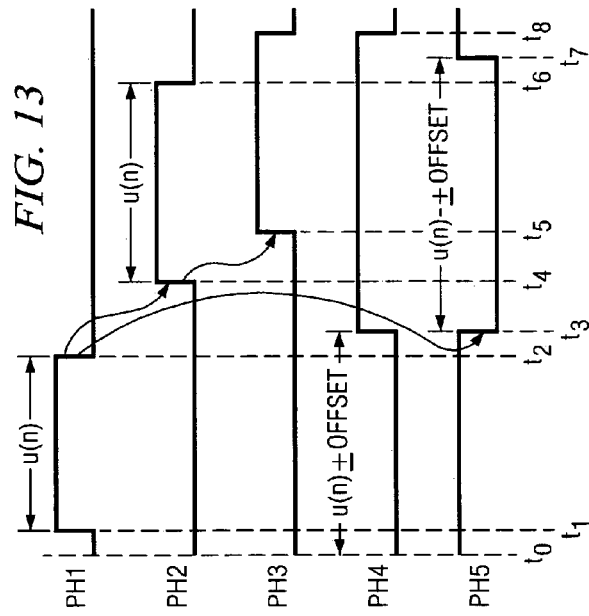
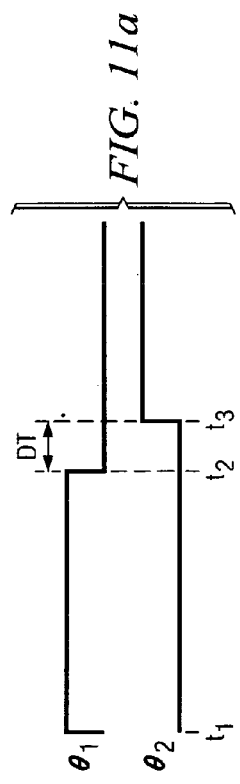
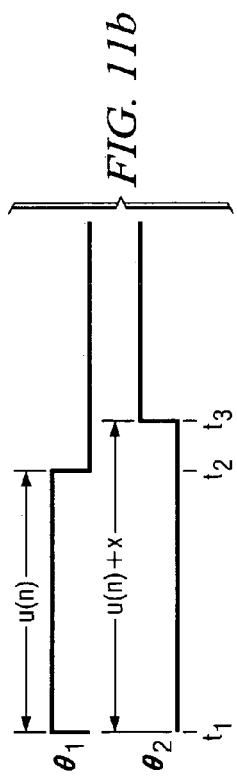
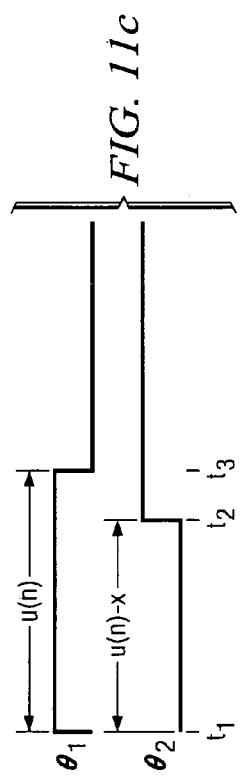
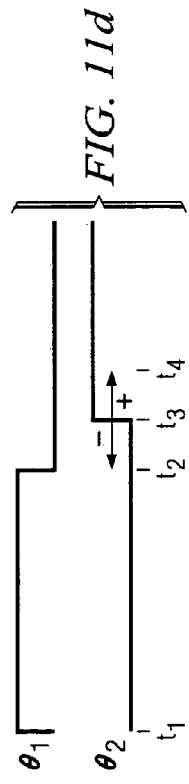

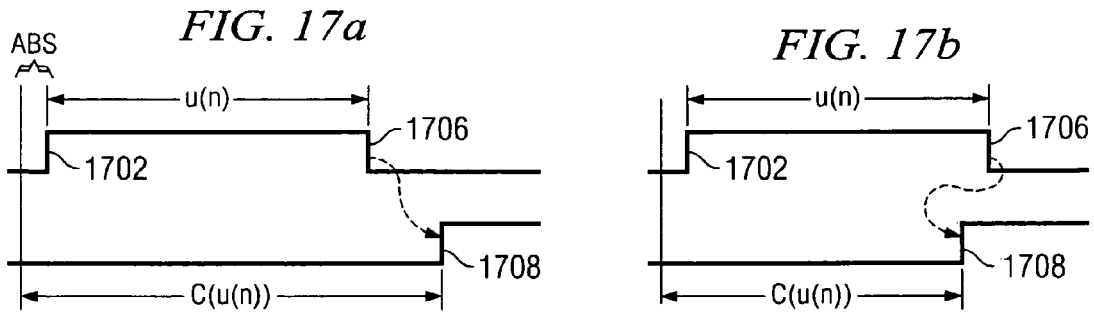
FIG. 17a
FIG. 17b
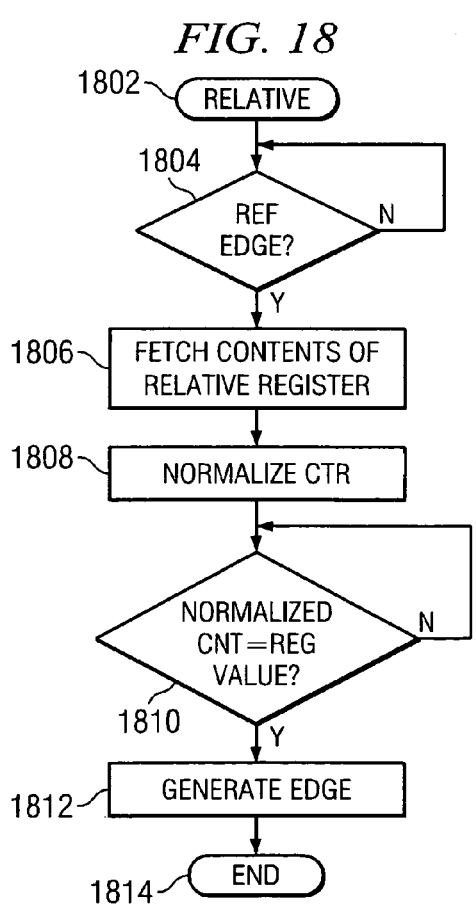
FIG. 18
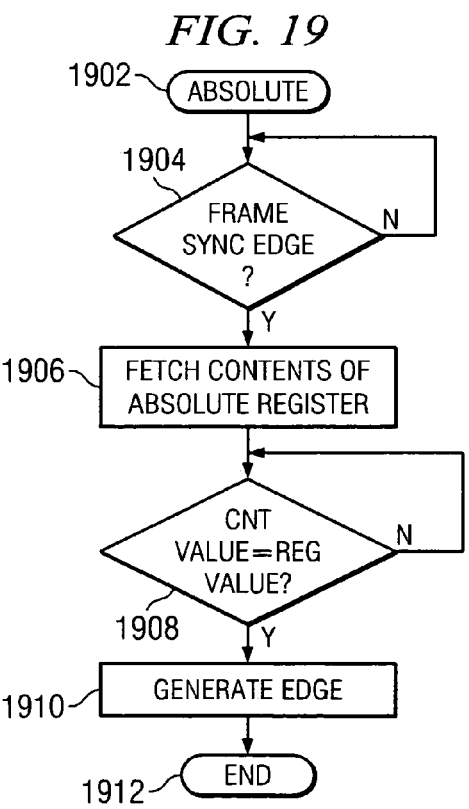
FIG. 19

MCU/DRIVER POINT OF LOAD DIGITAL CONTROLLER WITH OPTIMIZED VOLTAGE

TECHNICAL FIELD OF THE INVENTION

The present invention relates to DC-DC power converters, and more particularly, to a point of load digital controller having optimized voltages.

CROSS-REFERENCE TO RELATED APPLICATIONS

This application is related to U.S. patent application Ser. No. 11/172,344 filed on Jun. 30, 2005 entitled "DIGITAL PWM CONTROLLER FOR DIGITAL POWER SUPPLY HAVING PROGRAMMABLE DEAD TIMES" and is incorporated herein by reference.

BACKGROUND OF THE INVENTION

DC-DC power converters are utilized in situations where one DC voltage is converted to another DC voltage. In one application, that associated with PC based systems, the processor requires a fairly low voltage and a fairly high current. Rather than convert an incoming AC voltage down to a very low DC voltage and then route the low DC voltage across a PC board, a higher DC voltage is output by the power supply, routed around to the various components on the PC board and then, proximate to the processor, the voltage is down converted to a very low level on the order of 1.0 V. This requires a conversion device to be disposed proximate to one or more high current integrated circuits on the board.

Typical DC-DC converters are fabricated using a switching supply that utilizes a switched inductor or capacitor configuration with the input DC voltage switched to the input thereof with a periodically waveform operating at a preset switching frequency with a varying duty cycle. By sensing the output voltage and comparing it with a desired voltage, the duty cycle of the waveform can be adjusted to control the amount of current supplied to the reactive components. This control is facilitated with a negative feedback control loop.

There are two types of feedback loops, an analog feedback loop and a digital feedback loop. The analog feedback loop is well understood and provides some advantages over the other type of feedback loop, the digital feedback loop. Each of the feedback loops has associated therewith a voltage sense input for sensing the supply output voltage and a pulse width modulator (PWM) for generating switching pulses for driving switches. The sensed voltage is compared in the analog domain to a desired operating DC voltage to generate an error voltage that is reduced to essentially zero volts at regulation. To compensate for loop phase shift, there is provided a compensator. This provides some phase lead in the feedback loop for the purpose of loop stability. The digital controller portion of the digital feedback loop is similar to the analog feedback loop. The voltage signal sense input utilizes an analog-to-digital converter (ADC) to convert the output voltage to a digital value and then compare this to a desired voltage to determine the difference voltage as an error voltage. A digital compensator then provides some phase lead to the feedback to maintain stability in the control loop. This digital error voltage is then converted into a varying pulse width for output to the driving switches on the switching converter. This in effect is a digital-to-analog converter. Typical switching converters such as buck converters can utilize single or multiple phases to facilitate the switching operation.

Analog controllers do not have the ability to independently control the dead time for control signals for complementary switchers. For analog controllers the rising edge of a second control signal is based upon a falling edge of a first control signal. Thus, the second control signal is completely dependent on the falling edge of the first control signal. Some manner for independently controlling arising edge of a second control signal with respect to a falling edge of the first control signal would provide much greater control of the operation of the switched power supply.

High power switched power supplies often have problems when switching between complementary switches of the supply with various power losses. These power losses can be caused by shoot through currents, body diode conduction, $R_{DS}$ on losses and gate losses within the switches of the switched power supply. Thus it here is a need for the ability to control these losses within controllers providing control signals to the switched power supplies. By minimizing or eliminating these losses, the power supplies may be programmed to operate with improved power efficiencies thus improving the overall operation of the switched power supply circuitry.

SUMMARY OF THE INVENTION

The present invention disclosed and claimed herein, in one aspect thereof, comprises a system for optimizing power efficiency of a switching power converter operating at a switching frequency. A digital controller receives an analog signal representing an output DC voltage of the switching power converter for comparison to a desired output voltage and generates switching control signals to control the operation of the power supply to regulate the output DC voltage to said desired output voltage. At least two of the switching control signals have a dead time between a first edge of a first control signal and a second edge of a second control signal. The dead time is programmable to control a power efficiency of the switching power converter. The switching control signals further switch the power supply between a continuous conduction mode and a discontinuous conduction mode responsive to a mode control signal. The operation of the digital controller is parameterized by a set of operating parameters. A driver circuit connects to an output of the digital controller to drive the switching control signals and includes an input for a regulated voltage. A voltage regulator selects the regulated voltage to the driver circuit responsive to a voltage control signal. A micro controller determines the parameters used by said digital controller, establishes the programmable dead time between the control signals and generates the mode control signal responsive to a current signal from the switching power converter to substantially maximize the power efficiency of the switching power converter, generate the voltage control signal to the voltage regulator.

BRIEF DESCRIPTION OF THE DRAWINGS

For a more complete understanding of the present invention and the advantages thereof, reference is now made to the following description taken in conjunction with the accompanying Drawings in which:

FIGS. 11a-d are timing diagrams illustrating a programmable dead time for complementary switches;

FIG. 13 is a timing diagram for the phase inputs to each of the switching transistors of the circuit of FIG. 12;

FIGS. 17a and 17b illustrate the generation of a relative edge associated with a dead time between two edges;

FIG. 18 illustrates a flow chart depicting the operation of the generating of a relative edge;

FIG. 19 illustrates a flow chart depicting the operation of generating an absolute edge;

DETAILED DESCRIPTION OF THE INVENTION

Figure 1:
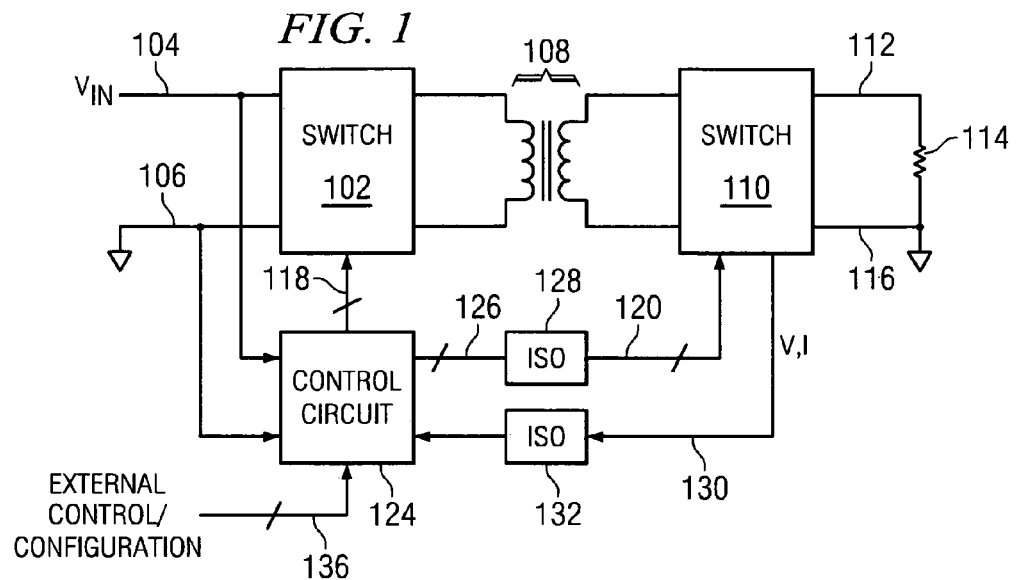
FIG. 1 illustrates an overall block diagram of a switching power supply.

Referring now to FIG. 1, there is illustrated a top level schematic diagram for the switching power supply of the present embodiment, which in this FIG. is illustrated as a half bridge power supply. The main portion of the power supply comprises a primary switch group 102 that is operable to receive an input voltage on a node 104, this being a DC voltage, and ground on a node 106. The primary switch group 102 is coupled through an isolation transformer 108 to a secondary switch group 110. The secondary switch group 110 is operable to drive an output voltage node 112 that is connected to one terminal of a load 114, the secondary switch group 110 also having a ground connection on a node 116, the load 114 disposed between the node 112 and the node 116. The two switch groups 102 and 110 are operable to operate in conjunction with various pulse inputs on a control bus 118 associated with the primary switch group 102 and with various pulse inputs on a control bus 126 associated with the secondary switch group 110.

A digital control circuit 124 is provided which is operable to control the operation of the primary switch group 102 and the secondary switch group 110. The nodes 104 and 106 are provided as inputs to the digital control circuit 124 for sensing the voltage and current on the primary, the digital control circuit 124 generating the information on the bus 118 for control of the primary switch group 102. The control circuit 124 must be isolated from the secondary switch group 110. This is facilitated by driving a bus 126 through an isolation circuit 128, such as an opto-isolator, to drive the bus 120. Similarly, the control circuit 124 is operable to sense the voltage and current levels on the output node 112 through sense lines 130 which are also connected through an isolation circuit 132 to the digital control circuit 124. The digital control circuit 124 is also interfaced to a bus 136 to receive external control/configuration information. This can be facilitated with a serial data bus such as an SMB serial data bus.

Figure 2:
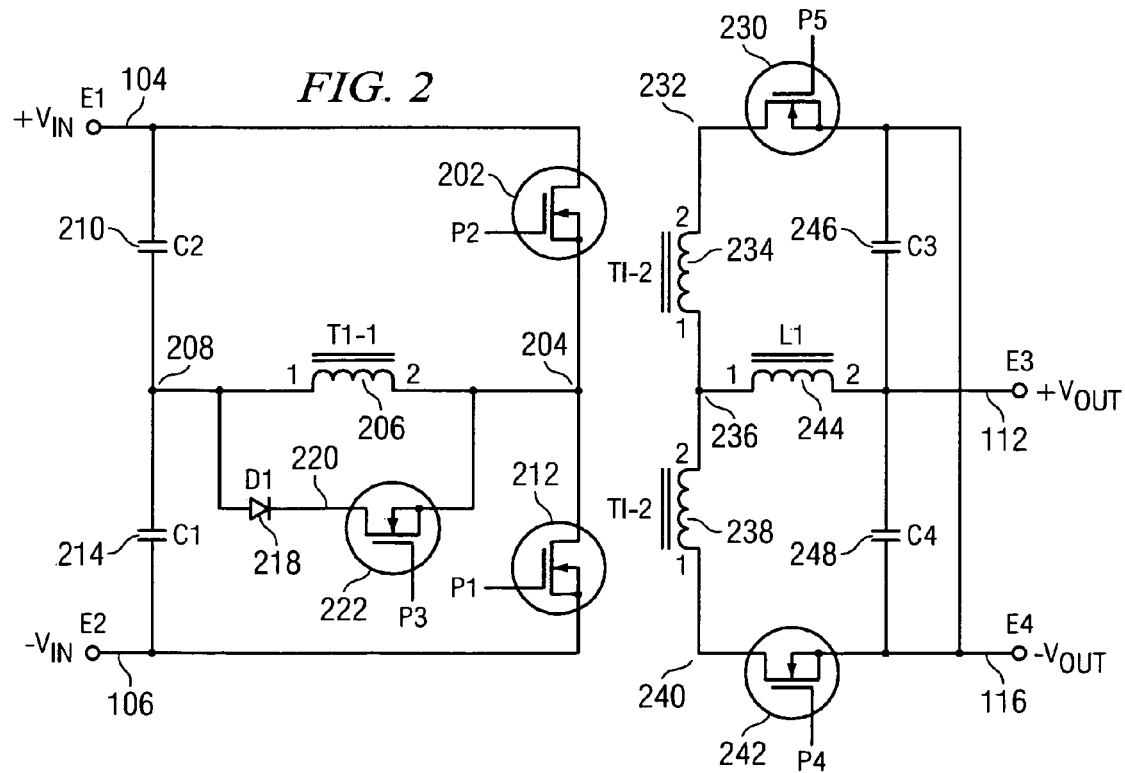
FIG. 2 illustrates a schematic diagram of the switching portion of a half bridge power supply.

Referring now to FIG. 2, there is illustrated a detailed schematic diagram of the primary switch group 102, isolation transformer 108 and secondary switch group 110. The node 104 is connected to one side of the source-drain path of a power switching transistor 202, the other side thereof connected to a node 204. Node 204 is connected to one side of the primary of isolation transformer 108, a primary 206. The other side of primary 206 is connected to a node 208. Node 208 is coupled to node 104 through a capacitor 210. Node 106 is coupled to one side of the source-drain path of a switching transistor 212, the other side thereof connected to node 204. Node 208 is coupled through a capacitor 214 to node 106. A diode 218 has the anode thereof connected to node 208 and the cathode thereof connected to a node 220, node 220 connected to one side of the source-drain path of a switching transistor 222, the other side thereof connected to node 204.

Switching transistor 212 is controlled by a switching pulse P1, the gate of switching transistor 202 controlled by a switching pulse P2 and the gate of switching transistor 222 controlled by switching pulse P3. Switching pulses P1, P2 and P3 all form part of the bus 118.

The secondary switch group 110 is comprised of a switching transistor 230 having the source-drain path thereof connected between the node 116 and a node 232, the gate thereof controlled by a switching pulse P5. Node 232 is connected to one side of a winding 234 which forms part of the secondary of the isolation transformer 108. The other side of winding 234 is connected to a center tap node 236, node 236 connected to one side of a winding 238, the other side thereof connected to a node 240. Winding 238 and winding 234 form the secondary of transformer 108.

Node 240 is connected to one side of the source-drain path of a switching transistor 242, the other side thereof connected to node 116 and the gate thereof connected to a switching pulse P4. An inductor 244 is connected between node 236 and the output node 112. The output node 112 is coupled to the ground node 116 through a capacitor 246 which is connected proximate to the other side of the source-drain path of transistor 230 and coupled through a capacitor 248 to node 116 proximate to the other side of the source-drain path of switching transistor 242.

Figure 3:
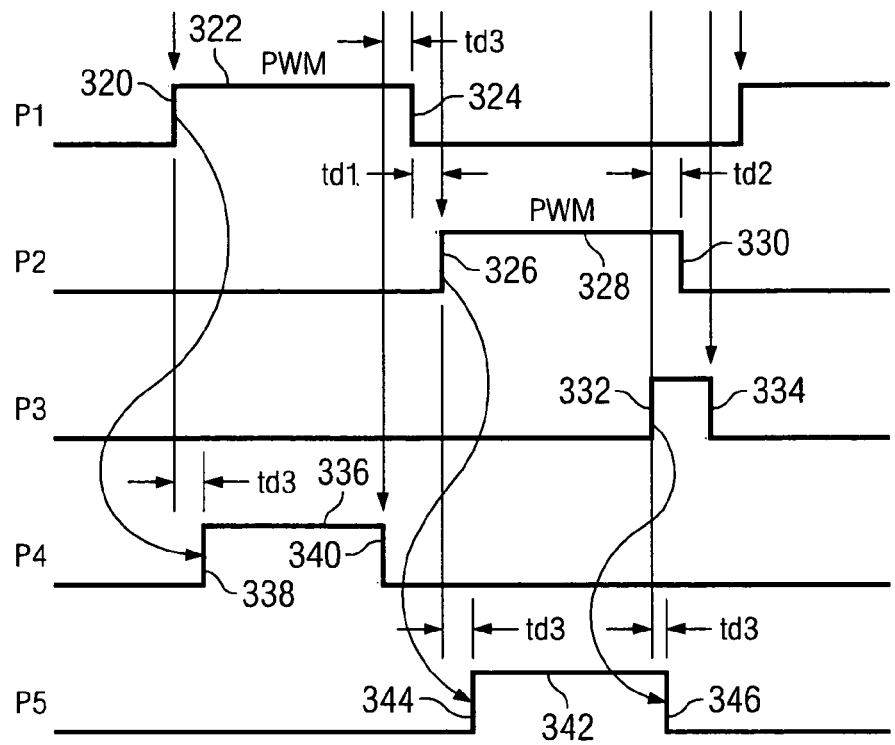
FIG. 3 illustrates the timing diagram of the control pulses to the switching power supply.

Referring now to FIG. 3, there is illustrated a timing diagram for generating the switching pulses to operate the switch of FIG. 2. The switching pulse P1 is a pulse-width modulated switching pulse having a rising edge 320. The rising edge 320 changes the level to a high level 322 which then returns to the low level at a falling edge 324. The switching pulse P2 is delayed from the falling edge 324 by a delay $t_{d1}$. The rising edge 326 changes the level of switching pulse P2 to a high level 328 followed by a change back to a low level having a falling edge 330. The switching pulse P3 goes from a low level to a high level ahead of the falling edge of P2 by delay time $t_{d2}$. The switching pulse P3 returns to the low level at a falling edge 336.

In the output switch, the switching pulse P4 goes from a low level to a high level 336 at arising edge 338. The rising edge 338 is delayed from the rising edge 320 by a delay $t_{d3}$. The switching pulse P4 returns to a low level ahead of the falling edge of P1 by delay time $t_{d3}$. The switching pulse P5 goes from a low level to a high level 342 at a rising edge 344 which is delayed from edge 326 of switching pulse P2 by a delay $t_{d3}$. Switching pulse P5 returns to a low level ahead of the rising edge of P3 by delay $t_{d3}$.

It can be seen that the switches 202 and 212 in FIG. 2 are controlled by switching pulses P1 and P2. The delay $t_{d1}$ is the duration of time required for transistor 212 to go from a conducting state to a non-conducting state and prior to transistor 202 going to a conducting state. The delay $t_{d1}$ is a delay that is required in order to ensure that the switches are completely off such that connecting the node 204 to the ground node 106 does not cause current to flow through transistor 202. This could result in a "shoot-through" current spike. Depending upon the circuit components and operating frequency, it may be necessary to vary this delay. Similarly, transistor 222 will be turned on prior to turning off switch 202 with the delay $t_{d2}$ allowing the diode 218 to be placed in parallel with the primary 206 prior to turning off transistor 202. Similarly, on the output switch, it is necessary that transistor 242 is maintained in a non-conducting state until transistor 212 is fully turned on and node 204 is sufficiently grounded. Further, it is necessary that the falling edge 346 be delayed until the transistor 222 has fully turned on, which requires the delay $t_{d3}$. This timing is conventional and, depending upon the application, the various delays will be adjusted, these adjustments due to the size of the load, circuit characteristics and operating frequency.

Digital Controller—Overall

Figure 4:
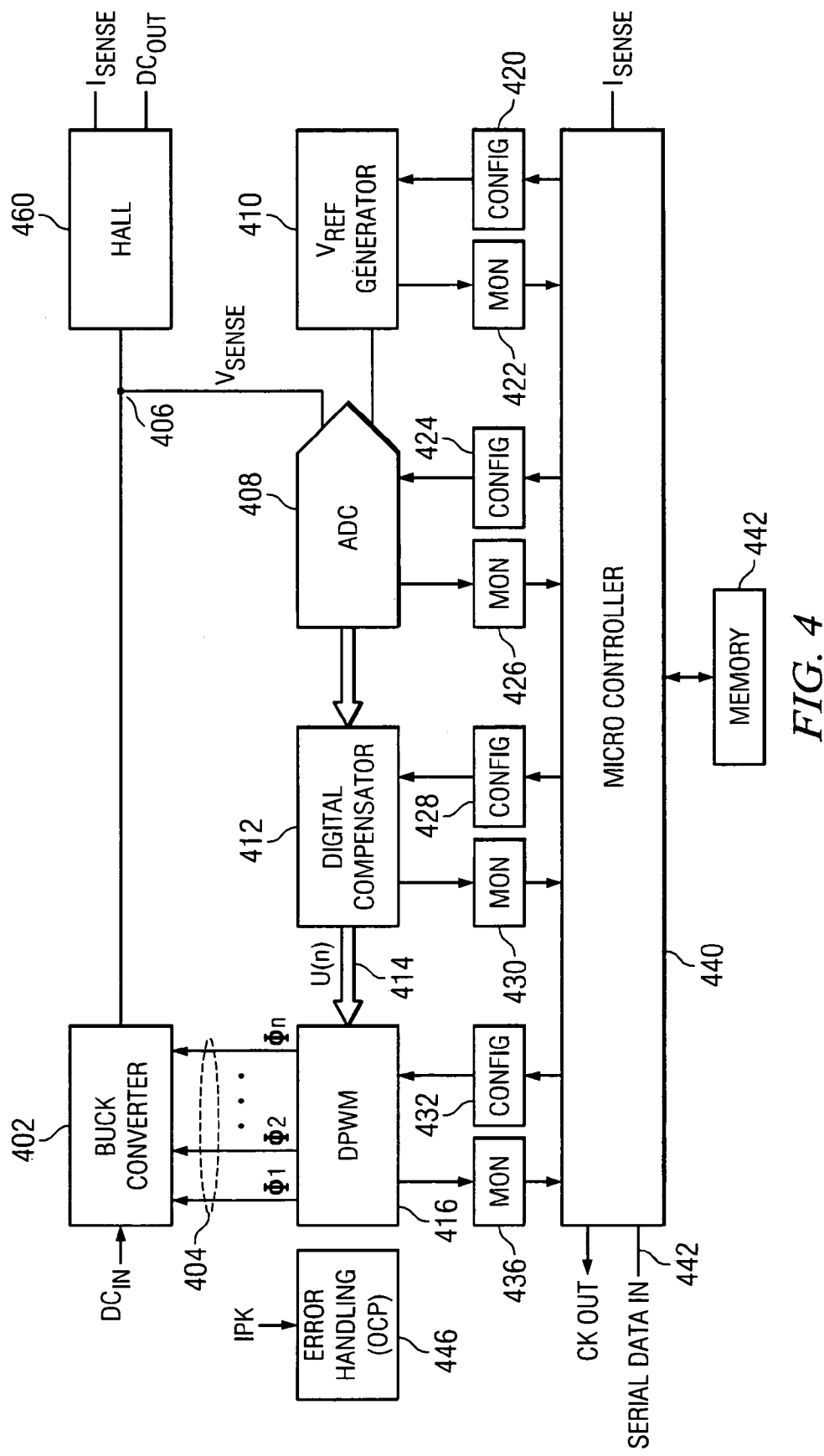
FIG. 4 illustrates a diagrammatic view of the digital controller utilized in conjunction with a buck converter.

Referring now to FIG. 4, there is illustrated a block diagram of the digital controller 124 of FIG. 1. As described herein above, the switching converter is generally realized with a half bridge converter, but a simpler buck converter 402 is illustrated in this figure. This requires a plurality of phases 404 for controlling the switches internal to the buck converter 402. This will allow a DC input voltage to be converted to a DC output voltage on output 406. The digital controller senses the output voltage on the output 406 as a sense voltage, $V_{SENSE}$, and inputs this to one input of a differential analog-to-digital converter (ADC) 408. The other input of the ADC 408 is connected to an analog or reference voltage generated by a $V_{REF}$ generator 410 that, as will be described herein below, comprises a digital-to-analog converter (DAC).

The output of the ADC 408 is a digital output that represents the difference between the analog output voltage on the DC output 406 and the "set point" generated by $V_{REF}$ generator 410. The output of the $V_{REF}$ generator 410 is typically the desired output voltage. As such, the operation of the control loop at regulation will typically result in a "0" output from the ADC 408. As will be described herein below, this is the "0" code for the ADC 408. This is input to a digital compensator 412, which is operable to provide some phase lead in the loop. The buck converter 402 is comprised of a combination of a series inductor and shunt capacitor that forms an LC network, which provides a phase lag of 180°. The control loop will typically be provided by a negative feedback loop and will result in an additional negative phase shift of 180°. If the loop were allowed to operate in this manner, this would result in a 0° total phase change which would be an unstable loop. As such, the digital compensator 412 provides some phase lead to stabilize the loop. The output of digital compensator 412 provides the digital control value u(n) on a digital output bus 414 for input to a digital pulse width modulator (DPWM) 416. This provides the various clock signals which provide the switching phases 404 to the buck converter 402 (or to a half bridge converter described herein above).

The ADC 408, digital compensator 412 and DPWM 416 are realized in hardware such that they provide relatively fast digital response and, once operating, operate in a fixed manner. However, each of the ADC 408, digital compensator 412, DPWM 416 and $V_{REF}$ generator 410 are operable to be configured and have the operation thereof monitored. The $V_{REF}$ generator 410 has a configuration block 420 associated therewith for configuring the operation thereof such that the voltage of the $V_{REF}$ generator 410 can be controlled. Additionally, a monitoring circuit 422 is provided for monitoring the operation thereof Similarly, the ADC 408 has a configuration block 424 for configuring the operation thereof and a monitoring block 426 for monitoring the operation thereof. The digital compensator 412 has a configuration block 428 for configuring the operation thereof and a monitoring block 430 for monitoring the operation thereof. The DPWM 416 has a configuration block 432 for configuring the operation thereof and a monitoring block 436 for monitoring the operation thereof.

As will be described hereinbelow, the ADC 408 is a parallel data converter that is configured with a Flash ADC topology. The digital compensator 412 is configured with a proportional-integral-derivative (PID) compensator with post processing filtering and DPWM 416 is realized with a state machine. The PID compensator is a discrete compensation network that is operable to apply a discrete time PID control law to the signal. The operation of each of these blocks is controlled through the associated configuration and monitoring blocks with a micro controller 440. The micro controller 440 is an instruction based engine that operates on instructions that can be downloaded to Flash memory 442, which is non-volatile memory. A serial data input 442 allows instructions to be input to the micro controller 440 for storage in the memory 442 and for various debug and control operations. Additionally, error handling is provided by a block 446 that basically provides for over current protection and over voltage protection to prevent damage to the buck converter 402 under certain conditions, as will be described in more detail herein below.

By providing a digital controller that, when operating and configured, operates independent of the programmable micro controller 440, the functionality of the digital controller is embedded primarily within the circuitry of the primary block involving the ADC block 408, the digital compensator block 412 and the DPWM block 416. The micro controller 440 basically is the "housekeeper" for the digital controller which is operable to monitor the operation thereof. When the digital controller is operating at voltage regulation and once configured, very few actions need to be taken by the micro controller 440. However, when the digital controller is originally configured, depending upon the environment, the type of switching converter utilized, etc., the digital controller will be configured by the micro controller 440 for a specific application. Even for the given application, there are certain transients that occur, such as when the converter is powered up, when short circuits occur, when transient loads are applied, etc. and, thus, certain parameters of the various blocks need to be varied to accommodate such during the operation of the DC-DC converter. By providing an instruction based engine such as the micro controller 440 in a monitoring mode and configuration mode, the operation of the digital controller can be monitored and then the parameters thereof changed temporarily, if necessary, to account for this change. To implement the entire digital controller in an instruction-based engine such as a DSP would require a large amount of programming operations. By providing a hardware based digital controller as the primary block, the functionality has been embedded within the hardware by the chip designer. The DSP solution, on the other hand, typically utilizes a general purpose DSP and the value or functionality of the digital controller is facilitated through programming, which can be complex and typically is utilized only for very high-end digital controllers. Further, the implementation of the primary digital control in hardware provides for a more efficient design that utilizes the circuitry and is more power efficient, which is important in low power DC-DC converters, without sacrificing the benefits of digital control.

Figure 5:
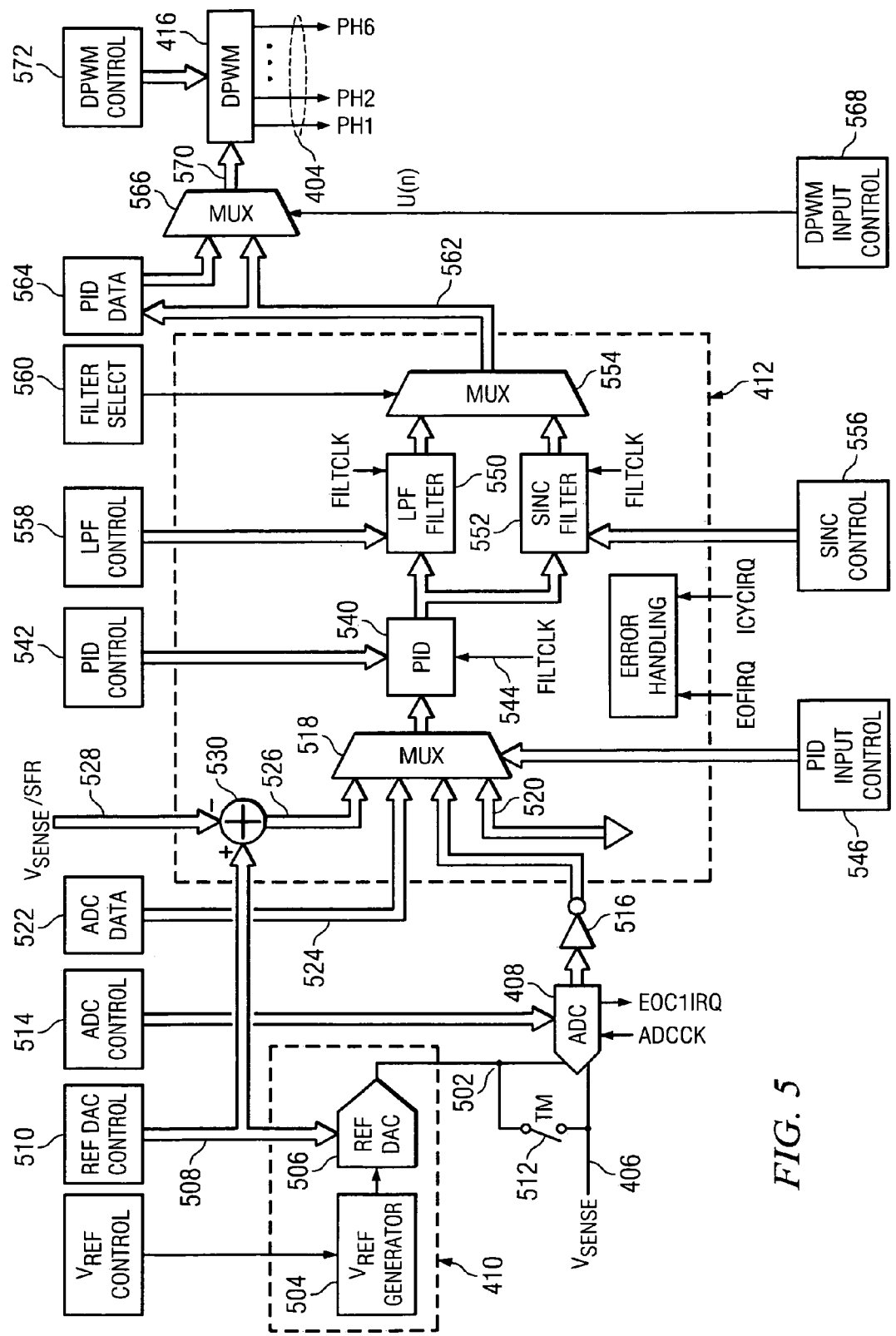
FIG. 5 illustrates a more detailed view of the digital controller.

Referring now to FIG. 5, there is illustrated a more detailed block diagram of the digital controller. The ADC 408 is a differential Flash ADC that is operable to determine as a digital value the difference between the voltage on the DC output node 406, that being the $V_{SENSE}$ voltage, and a reference voltage on a node 502. This analog reference voltage on node 502 is generated by the $V_{REF}$ generator 410. This is comprised of an analog reference voltage generator 504 which is operable to generate a fixed analog reference voltage based on an internal reference such as a bandgap generator. The bandgap generator is a conventional circuit that is utilized to generate temperature and process stable voltages. This is not shown in the illustration of FIG. 5. The $V_{REF}$ generator 504 will generate this reference voltage and provide it as a reference input to a conventional reference digital-to-analog converter 506 (reference DAC). This is a scaling DAC that is operable to receive a digital word on a bus 508 from a reference DAC control block 510 that is controlled by the micro controller 440. This is basically a register that can be written to for the purpose of generating the reference DAC voltage. The reference DAC 506 is operable to convert this digital value on bus 508 to an analog voltage on node 502 for input to one of the differential inputs of the ADC 408. Typically, the voltage generated by $V_{REF}$ generator 504 is a 1.25 V analog voltage. The output of the reference DAC 506 comprises the desired voltage of the DC-DC converter. In one embodiment, this is approximately 1.0 V, a conventional processor voltage. The reference voltage on node 502 is compared with the $V_{SENSE}$ voltage on node 406 and, when regulated, this should essentially be zero. In the test mode of operation, there is provided a switch 512 which is operable to short the two inputs together. This will be described herein below.

The ADC 408, as will be described herein below, is a parallel ADC of the Flash type. It is a window ADC that is operable to generate a zero voltage output when the differential input is "0." An ADC control block 514 is operable to provide a control input to the ADC 408. The control block 514 provides a variable LSB input to the ADC 408 for use with some of various features thereof. The ADC operates on an ADC CK clock signal and also generates an end of conversion cycle interrupt, EOC1 IRQ. This provides an indication of when a data conversion operation is complete on a given sample and digital data associated with the analog sample is ready to be output. The data is output through an inverter circuit 516 for input to one input of a 4-input digital multiplexer 518, which is part of the input interface to the digital compensator 412.

The digital compensator 412, in addition to receiving the output of the ADC 408 through the inverter 516, is also operable to receive a ground input on a digital input bus 520, ADC data from a register 522 through a bus 524 for digitally generated ADC data, primarily for test purposes, and also a "raw" data input on a bus 526. In one mode of operation, primarily associated with start-up and the such, the sensed voltage, $V_{SENSE}$, is determined by another ADC, which is described herein below, which is a SAR ADC. This is a slower ADC and the output thereof is stored in a special function register, $V_{SENSE/SFR}$, the output of which is provided on a bus 528. The difference between the digital representation of the $V_{SENSE}$ voltage and the actual input to reference DAC 506 on the bus 508 is determined by a digital subtraction block 530, the output of which comprises the bus 526. Therefore, a single-ended SAR can be utilized to bypass the ADC 408 and determine a value for input to the digital compensator 412 during start-up and the such, this providing the differential operation in the digital domain. However, during regulation, the ADC 408 is the preferred input data converter.

The output of the multiplexer 518 is input to a PID controller block, which provides a proportional, integral, derivative (PID) control algorithm. One difficulty associated with designing a controller arises from the LC resonance of a buck converter. An open-loop frequency-response analysis exhibits a resonant peak at the cutoff frequency of the LC filter. A sharp peak, quantified by the quality factor (Q), is desirable for efficient power conversion for lossless power conversion. For a simple integral control, this resonant peak must be kept below unity gain in the open-loop frequency response to ensure stability. Such a controller configuration has a low loop bandwidth and leads to slow transit response characteristic. This PID block 540 provides the requisite loop stability without sacrificing bandwidth and improves the loop's transient response. The proportional and derivative control blocks, as will be described herein below, introduce compensation zeros that push unity-gain beyond the resonant peak and eliminates the bandwidth limitation otherwise imposed by the resonant nature of the buck converter. There is provided a PID control block 542 that controls the operation of the PID 540 by providing, as will be set forth herein below, gain constants for the operation thereof. The operation is clocked with a filter clock, FILTCLK, on a clock input 544. The input to the PID 540 is determined by the output of multiplexer 518, which is controlled by a PID input control block 546. The clock rate is around 10 MHz, wherein the switching frequency of the power supply is around 500 kHz The analog corollary to the digital controller has one inherent benefit in that the overall operation of the analog controller has an inherent low pass filter function associated therewith. The PID 540, on the other hand, has an amplitude and phase response that increases with increasing frequency such that the gain thereof becomes relatively high at higher frequencies and the phase also increases in an ever increasing phase leading manner. To accommodate the frequency response of the PID, post processing filtering is required. This is facilitated in the present embodiment with either a low pass filter, represented by an LPF filter block 550 or a sinc filter block 552. The output of the PID 540 is input to both of these blocks 550 and 552 and the outputs thereof selected with a two-input digital multiplexer 554. The sinc filter operation 552 provides for a plurality of "notches" which are controlled by a sinc control block 556, the sinc filter block 552 clocked by the FWLTCLK clock signal. The LPF filter block 550 also utilizes variable poles and zeros that are set by an LPF control block 558. The LPF filter block 550 is also clocked by the filter clock, FILTCLK. The output of multiplexer 554 provides the output from the digital compensator 412, the output selected by the multiplexer 554 controlled by a filter select block 560.

The output of the multiplexer 554 from the digital compensator 412 is provided on a digital data bus 562. This is input to a PID data register 564 for the purpose of monitoring the operation thereof, such that the output of the digital compensator block 412 can be monitored. The output of the multiplexer 554 is also input to the input of a two-input digital multiplexer 566, the other input thereof receiving data from the PR) data block 564, such that the operation of the compensator 412 can be bypassed. The multiplexer 566 is controlled by a DPWM input control block 568. The output of the multiplexer 566 provides the u(n) error signal, which is output on a bus 570 to the DPWM 416. The DPWM 416, as set forth herein above, is a state machine and is controlled by a DPWM control block 572. The DPWM block, as will be described herein below, is operable to receive various control signals from the DPWM control block 572 from the micro controller 442 and is also operable to generate a plurality of interrupts (not shown) and receive various interrupts. For example, at the end of a given frame, there will be an EOFIRQ interrupt generated, and the DPWM 416 will also receive various interrupts from the error handling block 446 to indicate either over current situations or over voltage situations.

Figure 6C:
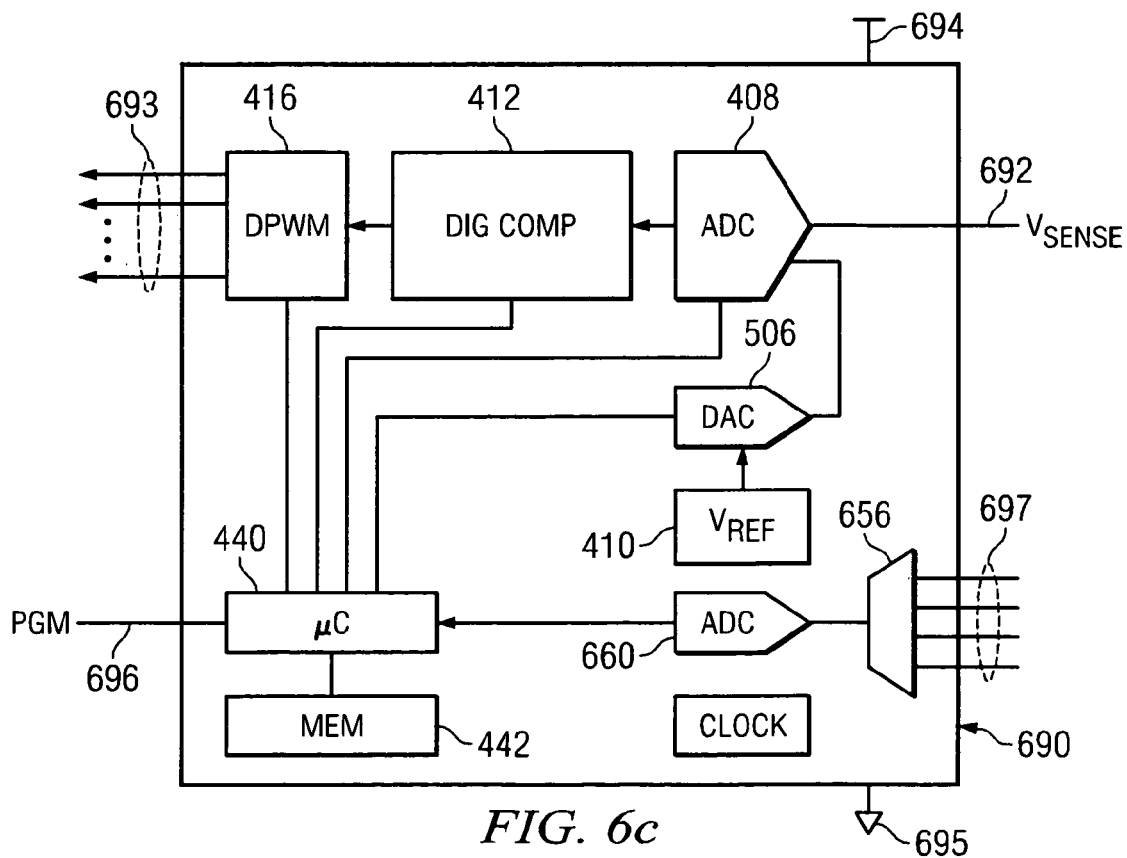
FIG. 6c illustrates a diagrammatic view of a monolithic solution utilizing the embodiments of FIGS. 4, 5 and 6.
Figure 6A:
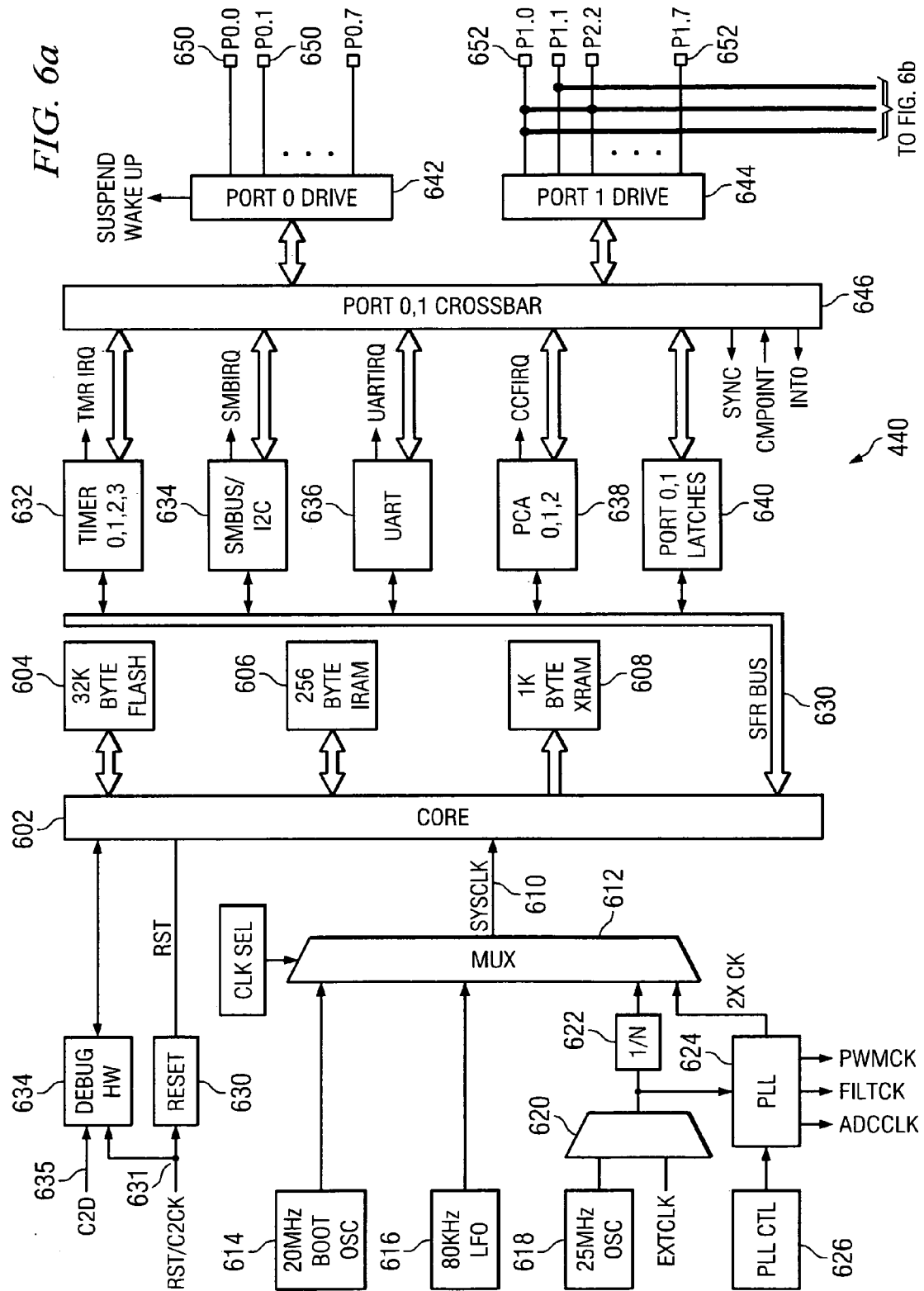
FIGS. 6a-6b illustrate a block diagram of the micro controller portion of the digital controller.
Figure 6B:
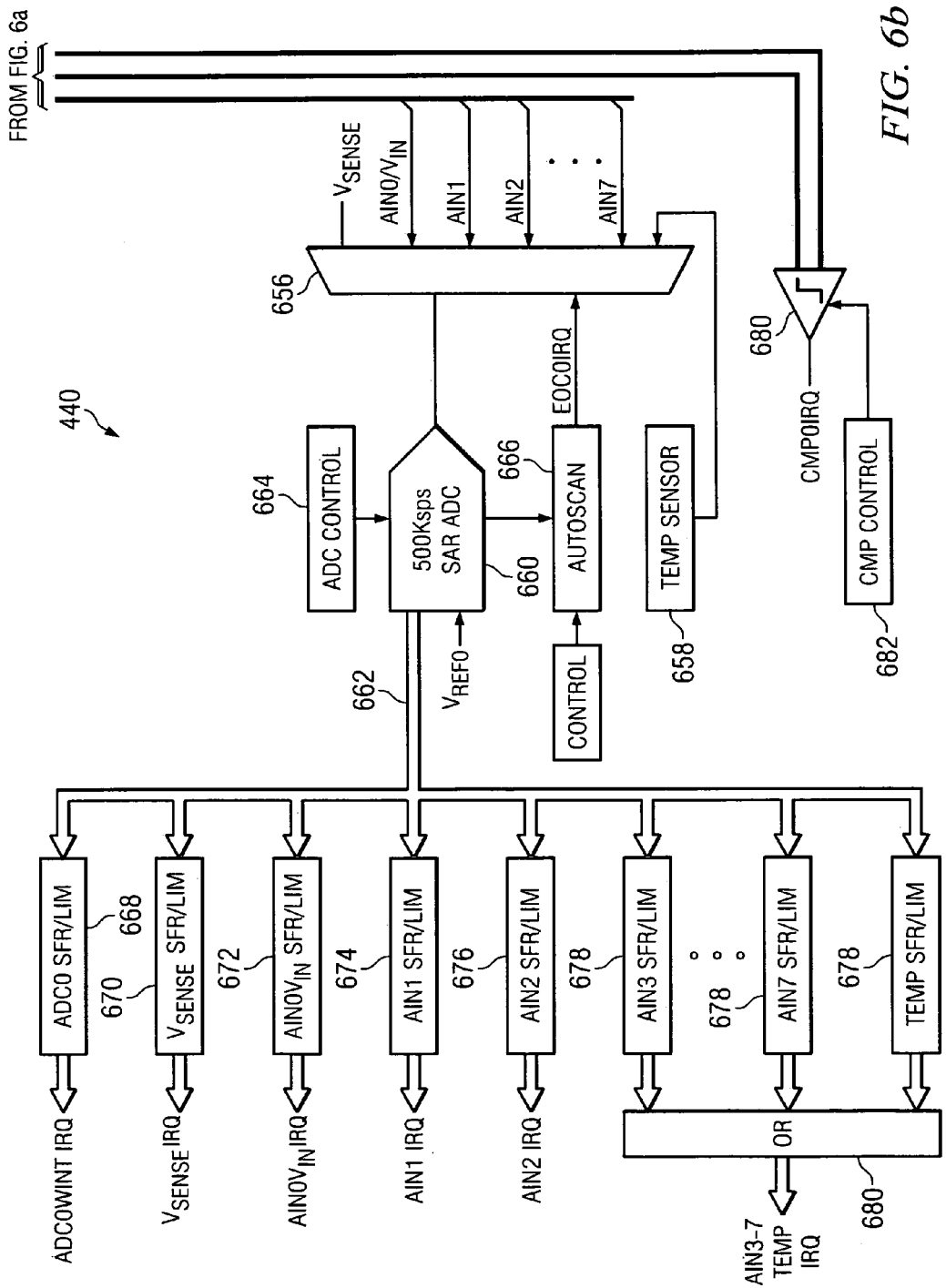

Referring now to FIG. 6, there is illustrated a detailed block diagram of the micro controller 440. This micro controller 440 is an 8051 instruction-based engine which is substantially disclosed in U.S. patent application Ser. No. 10/244,344, filed on Sep. 16, 2002 and entitled "Precision Oscillator for an Asynchronous Transmission System," which is incorporated herein in its entirety by reference for all purposes whatsoever. At the center of the micro controller 440 is a processing core 602 which is an 8051 microprocessor engine. This is an instruction-based engine. There is provided a 32K byte Flash memory block 604, 256 byte IRAM block 606 and a 1K byte XRAM block 608, providing memory for the processing core 602. Clock signals are provided to the core 602 in the form of a system clock, SYSCLK, on a clock line 610. This is provided on the output of a multiplexer 612. The multiplexer is operable to receive the input thereof from a 20 MHz boot oscillator block 614, an input from an 80 kHz low frequency oscillator block 616 to provide an 80 kHz clock for use in a sleep mode, or a higher frequency clock in the form of a divided down 25 MHz oscillator 618. The 25 MHz oscillator is the primary oscillator at the operating frequency of the core 602, as the core 602 operates at high frequency or at low frequency. However, at low frequency, the processing of instructions occurs at a much slower rate and this mode is typically used in a sleep mode. In the normal operating mode, typically the higher frequency clock oscillator is utilized. This clock is a non-crystal based clock and has an accuracy of approximately 2%. The output of the clock 618 is input through a two-input multiplexer 620 to the multiplexer 612, the output of multiplexer 620 passed through a divide block 622 in order to divide the frequency of the clock, if necessary. Additionally, an external clock is input to the other input of multiplexer 620, such that either the internally generated 25 MHz clock can be utilized or an external clock can be utilized. A phase lock loop 624 is provided which is controlled by a PLL control block 626 and this utilizes the 25 MHz clock 618 as a reference and then multiplies this clock up to as high as 400 kHz. This provides an output to one end of the multiplexer 612 for selection as the SYSCLK. This PLL 624 is operable to generate the other clocks associated with the operation of a digital controller, the clock for the DPWM 416, PWMCK, the filter clock, FILTCLK, and the ADC clock, ADCCLK. This will be described herein below.

The core 602 is also operable to receive a Reset signal on a block 630, which is operable to generate a reset when it is not in a debug operating mode. In a debug operating mode, the Reset input on a node 631 is input to the clock input of a debug hardware block 634 to provide a clock signal thereto, the other input being a serial data input on a line 635. This is a two-wire serial data port that allows for very low clocked data to be input to the core 602 during a debug mode. In the reset mode, the reset block 630 provides the reset signal to the core 602.

The core 602 is interfaced through a special function register (SFR) bus 630 to various I/O blocks. In the embodiment illustrated herein, four timers 632 are provided. Each of these timers is operable to have the parameters thereof set, and initiated and each of them generates various timer interrupts, TMRXX IRQ, signals. Additionally, there are provided a number of serial bus configurations for allowing for various formats of a serial data interface. One of these is the SM Bus/I2C format, in a block 634. This is a conventional serial data format. Additionally, there is provided a UART functionality in a block 636. There is provided a programmable counter/timer array (PCA) block 638 and a plurality of port latches 640 for interfacing with a port "0" block 642 and a port "1" block 644 for transmitting and receiving data therefrom. All of the blocks 632-640 are interfaced through a crossbar matrix block 646, which is disclosed in U.S. Pat. No. 6,738, 858, issued May 18, 2004, which is incorporated herein by reference. The crossbar matrix is operable to selectively connect any of the outputs of the blocks 632-640 to any of a plurality of output pins associated with the port driver 642 and 644, there being eight pins 650 associated with the port "0" driver 642 and eight pins 652 associated with the port "1" driver. These pins can function as digital outputs, digital inputs or analog inputs.

For analog sensing, all of the eight pins 652 associated with the port "1" driver are connectable to analog inputs of a multiple input analog multiplexer 656 which is operable to receive eight analog inputs, AIN0, AIN1, ..., AIN7, a $V_{SENSE}$ input and a Temperature input. The input voltage is connected to the AIN0 input for sensing thereof. A separate dedicated pin is provided for the $V_{SENSE}$ input for input to the multiplexer 656. An additional input is provided by an internal temperature sensor 658, which senses the chip temperature, which basically constitutes the environmental temperature, this being an input to the analog multiplexer 656. The output of the analog multiplexer 656 is input to the input of a 12-bit SAR ADC 660, operating at a sampling clock of 500 Ksps. This is a single-ended ADC that provides the digital output on a bus 662. The control for the ADC 660 is provided by the ADC control block 664. The analog multiplexer 656 is controlled by an auto scan block 666, which is operable to scan through all of the inputs in a cyclical manner. At the end of each conversion cycle, there is generated an interrupt EOC0 IRQ indicating the end of the conversion cycle for the ADC 660. This is input to the auto scan block 666 which will then increment the select control on the multiplexer to the next input to initiate a second or subsequent conversion operation. For each scan step, the output of the ADC 660 is "steered" or directed toward an associated special function register (SFR)/limiter (LIM). Each of these SFR/LINM blocks is operable to store the associated output, compare it with an internal fixed upper and/or lower limit, which can be varied upon power-up, and then output an interrupt if it exceeds the limit(s). In the first five SFR/LIMs, there is provided an ADC window interrupt in an SFR/LIM block 668, an SFR/LIM block for the $V_{SENSE}$ output 670, an SFR/LIM block 672 for the AIN0 output, an SFR/LIM block 674 for the AIN1 input, and an SFR/LIM block 676 for the AIN2 input. Each of these blocks 668-676 provide an associated interrupt, ADC0WINTIRQ, VSENSE IRQ, AIN0VIN IRQ, AIN1 IRQ, and AIN2 IRQ. Since the core 602 can only handle a certain number of interrupts, the remaining inputs, AIN3-AIN7 and TEMP are associated with respective SFR/LIM blocks 678. The output of each block 678 provides an associated interrupt to an OR gate 681. The output of the OR gate 680 provides an interrupt, which when recognized by the core 602, requires that the core 602 then "poll" the outputs of the SFR/LIM blocks 678, it being recognized that each of the SFR/LIM blocks occupies a unique address in the address space of the core 602, such that the contents thereof can be read, or in certain circumstances, written to. Whenever an interrupt is generated, the core 602 initiates an interrupt sub-routine for servicing that particular interrupt, as is the case with any interrupt generated.

There is also provided a comparator function for generating a comparator interrupt. A comparator block 680 is provided which is operable to have one compare input interface with the even ones of the pin 652 and a second input interface with the odd inputs thereto. This is a four comparator block, which is controlled by a comparator control block 682 and will generate a comparator interrupt whenever any of the respective inputs exceeds the threshold set therein.

Referring now to FIG. 6a, there is illustrated a diagrammatic view of an integrated circuit 690, which is operable to provide all of the functions for the digital control operation in a single integrated circuit. This integrated circuit 690 requires only connections from $V_{SENSE}$ on a pin 692, switching control signals on output pins 693, a power supply input on a power supply pin 694 and a ground connection on a pin 695. With these minimal number of pins, the entire digital control operation can be facilitated. This assumes that a program is provided in the memory 442. If the program is not "hard coded," some type of serial connection on at least one pin 696 is required, but it should be understood that other pins in the system can be multiplexed for use in programming, since programming is facilitated in a nonoperating mode. Further, there are provided a plurality of pins 697 that are operable to receive other sense analog input voltages. However, for the straightforward operation of the digital controller, all that is required is the $V_{SENSE}$ input. The other inputs are required for such things as over voltage protection and over current protection and for detecting the peak current for the purposes of voltage positioning, as will be described herein below.

As set forth herein above, the digital control section is a hardware digital control section comprised of the ADC 408, the digital compensation network 412 and the DPWM 416. Once these blocks are parameterized, they will provide the control function associated therewith. The internal reference generator 410 is operable to provide the internal reference, for conversion to an analog signal by the DAC 506. Thus, all the voltage reference information is contained in the integrated circuit 690. The on chip self-contained micro controller provides the monitoring and control functions such as over current protection, voltage positioning, etc. and, in general, provides all housekeeping functions to monitor the operation of the hardware digital control stream. The self-contained clock and on-board memory provide for the timing functions and the instructions for use by the micro controller, respectively. Therefore, it can be seen that the system of the present disclosure provides for a single monolithic solution that is low power due to the use of a state machine-driven digital controller without requiring the power overhead of an instruction based system, but still retains the intelligence of an instruction based system in the monitoring and reparameterizing aspect provided by the micro controller 440.

DPWM

Figure 7:
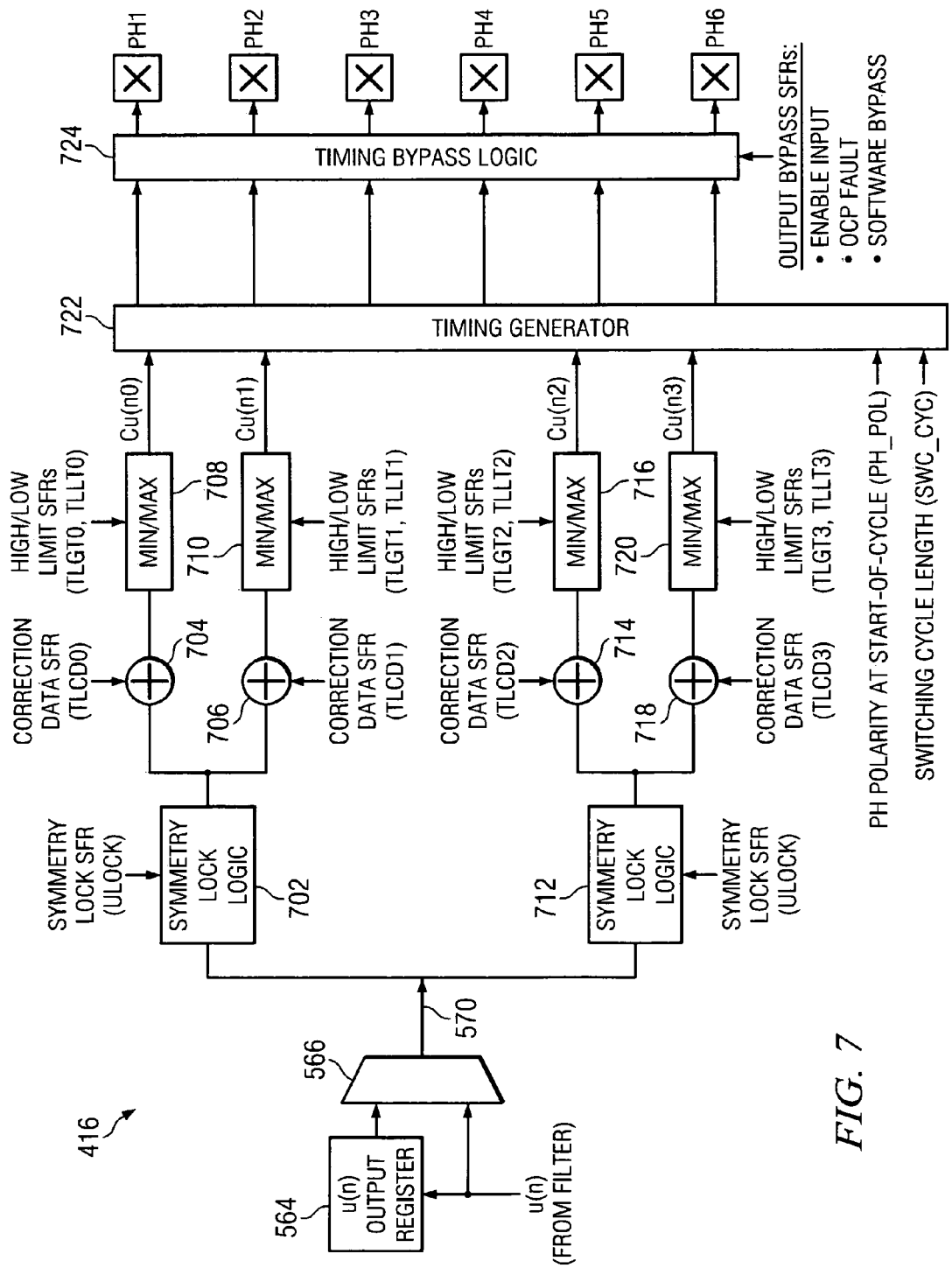
FIG. 7 illustrates a diagrammatic view of the DPWM.

Referring now to FIG. 7, there is illustrated a general block diagram of the DPWM 416. As noted herein above, the DPWM 416 is a state machine that is operable to generate up to six phases for use in driving external drivers that will control switches on the switching power converter. Each of these phases will be defined by a leading edge and a trailing edge, either leading or trailing edge being rising or falling. Either the u(n) signal from the digital compensator 412 or a micro controller generated PID value from the register 564 is provided on the bus 570 as an input to the DPWM 416. The original u(n) represents a number of clock cycles that the PH1 output is turned on per frame. The DPWM 416 provides for highly flexible operation, which is operable to accommodate various pulse width and phase modulation schemes. Phase-to-phase timing can be programmed for fixed (or zero) dead time, or the micro controller 440 can dynamically control dead time during converter operation. The DPWM 416 may be clocked at 200 MHz (5 nS resolution) or 50 MHz (20 nS resolution), depending on the setting associated therewith, these clocks generated by the PLL. It is noted that the DPWM is a state machine, such that, for each clock cycle, there is a result output by the state machine, as compared to an instruction based microprocessor or a DSP solution.

There are provided two paths from the input bus 570. The first path is associated with a Symmetry Lock logic block 702, which is operable to interface with a Symmetry Lock SFR in the micro controller 440. As noted herein above, there are a plurality of SFRs, some of which are not illustrated, each of these SFRs occupying a portion of the address space of the micro controller 440, such that they can be written to or read from. The Symmetry Lock logic block 702 is operable to latch each value output by the multiplexer 566 upon receiving a Data Ready signal. Since the digital compensator 412 operates at a clock rate of 10 MHz with a switching frequency of 500 kHz, for example, there will be many more samples of u(n) during a particular switching frame than may be required. However, u(n) can be changing and there may be modulation schemes and phase schemes that require an edge of the pulse to be sent based upon current data. The block 702 latches each value and, upon the occurrence of a predetermined lock condition, the data will be "locked" into the logic block 3402. This situation occurs when, for example, the trailing edge of PH1 requires current data to determine the position thereof. Once the trailing edge occurs on PH1 a system may be set up that, for example, the leading edge of PH1 a relative edge to the trailing edge of PH1 calculates its position relative to PH1 based upon the locked data in the logic block 702.

There are provided two separate paths output from the logic block 702, a first path associated with a summation block 704 and a second path associated with a summation block 706. Each of the summation blocks 704 and 706 is operable to receive a 2's complement correction data value from a correction data SFR, labeled TLCD0 and TLCD1, respectively, which basically each provide an offset. There may be situations where the designer needs to compensate the mismatch of the components in the power supply. As such, it may be desirable to add an offset value increasing or decreasing the value of u(n). This would allow for the adjustment of dead time between two output phases. Once corrected, each of the paths flows to an associated limit block 708 and 710, respectively, which will provide a corrected u(n). The limit block 708 is associated with the summation block 704 and receives high and low limits, TLGT0 and TLLT0, wherein the limit block 710 associated with the summation block 706 receives high and low limits TLGT1 and TLLT1, these limits associated with respective SFRs. By providing two correction paths for each Symmetry Lock logic block, this allows a first edge to be defined based upon currently changing data and then subjected to two different correction factors and two different limit factors.

There is provided a second Symmetry Lock logic path associated with a logic block 712, having associated therewith two paths associated with, in the first path, a summation block 714 and the limit block 716. The second path has associated therewith a summation block 718 and a limit block 720. These blocks have associated correction data and associated high/low limit values. This will provide two additional corrected u(n) values which can both be locked.

Each of the four corrected u(n) values form the blocks 708, 710, 716 and 720 are input to a timing generator 722 which generates the phase values for output to a timing generator bypass logic block 724. The length of a switching cycle can be defined by signal SWC_CYC and there is also provided via control of the micro controller 440 a start of cycle signal DPWM_EN. The polarity of the initial pulse edge, rising or falling, is determined by PH_POL.

Figure 8:
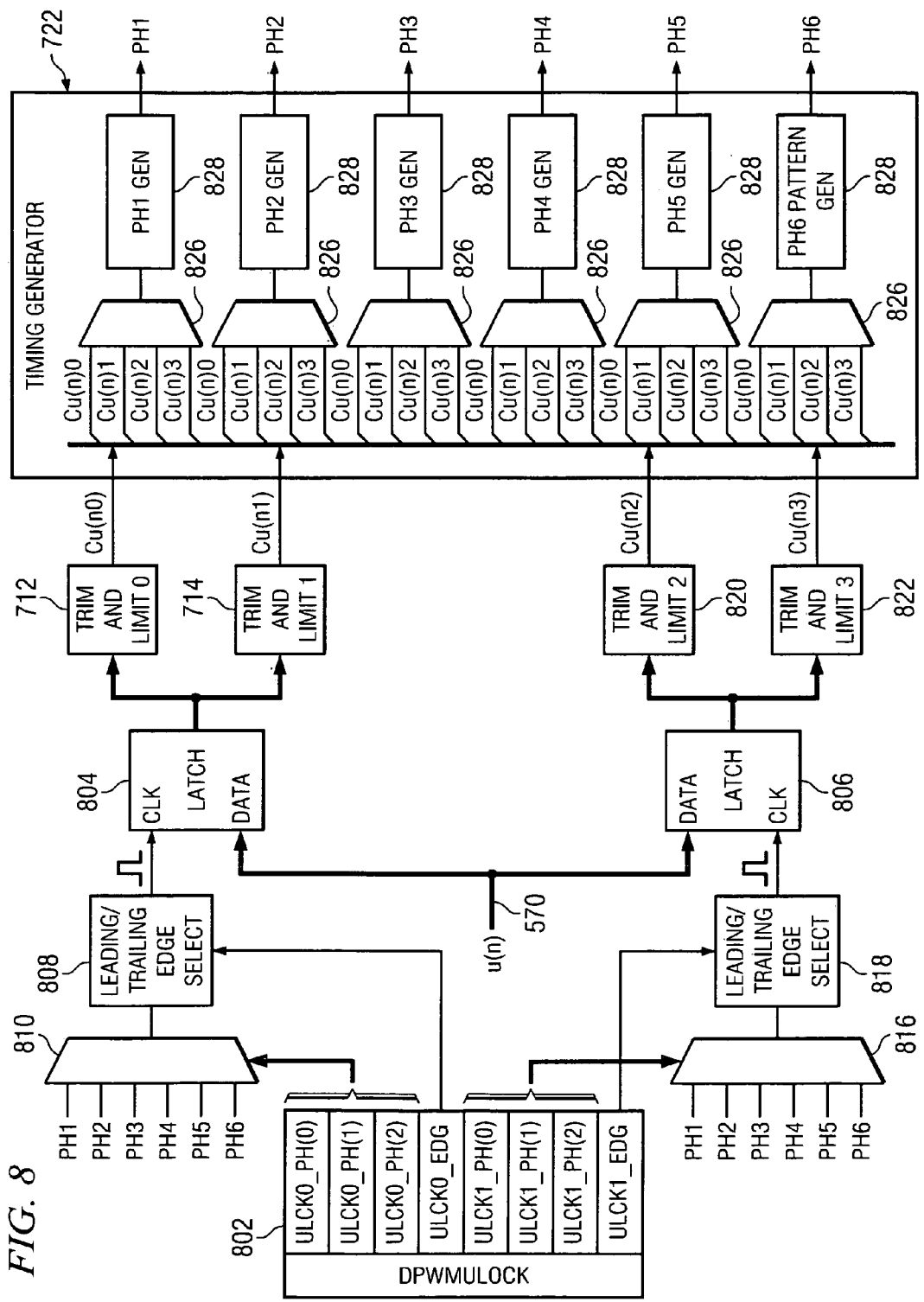
FIG. 8 illustrates a more detailed diagrammatic view of the DPWM.

Referring now to FIG. 8, there is illustrated a more detailed block diagram of the Symmetry Lock logic circuit. When enabled, the two Symmetry Lock logic blocks 802 and 812 store the value of u(n) once per switching cycle at a time specified by a register 802, DPWMULOCK. The two latch u(n) values are paired with two trim and limit functions, resulting in four unique corrected u(n) functions, resulting in four unique corrected u(n) functions that can be mapped to any of the PHn outputs in any combination. The value of u(n) on the data bus 570 is input to a data input of two latches 804 and 806 at the data input thereof. Each of the latches has a clock input. The clock input of latch 804 is connected to the output of a leading/trailing edge select block 808 which is controlled by the bit ULCK0_EDG bit of the register 802. This is operable to select either the leading or trailing edge of one of the six phases PH1-PH6 that are selected by a multiplexer 810. This is controlled by the first three bits of the register 802. As noted, the latch is operable to latch each value of the u(n) data therein. The output of the latch 804 is input to the trim and limit blocks 812 and 814, associated with the blocks 704, 708, 706 and 710 of FIG. 7. Similarly, there is provided in the second Symmetry Lock logic path a multiplexer 816 controlled by the bits 4-6 of register 802 for selecting one of the six phases and inputting that to a leading/trailing edge select block 818, the output thereof driving the clock input of the latch 806. The latch 806 is associated with two trim and limit blocks 820 and 822 that correspond to blocks 714 and 716, and blocks 718 and 720.

The timing generator 722 is comprised of a plurality of multiplexers and phase generators. Each path has a multiplexer 826 associated therewith and a phase generator 828, each of these being a pattern generator. Each multiplexer 826 is operable to receive all four of the corrected u(n) values and, depending upon which one is mapped to the particular phase path, input that to the associated pattern generator 828. The corrected u(n) values are mapped to one of the PHn outputs in any combination using the PHn_CNTL0 registers in the timing generator 722. The pattern generators 828 independently generate the PHn outputs responsive to the corrected u(n) values and the PHN_CNTL0 register values. This enables positive, negative or system management processor controlled dead times between the outputs which will be more fully discussed below. Each PHn output has its own pattern generator 828 which may be programmed to be modulated by any u(n) value.

Figure 9A:
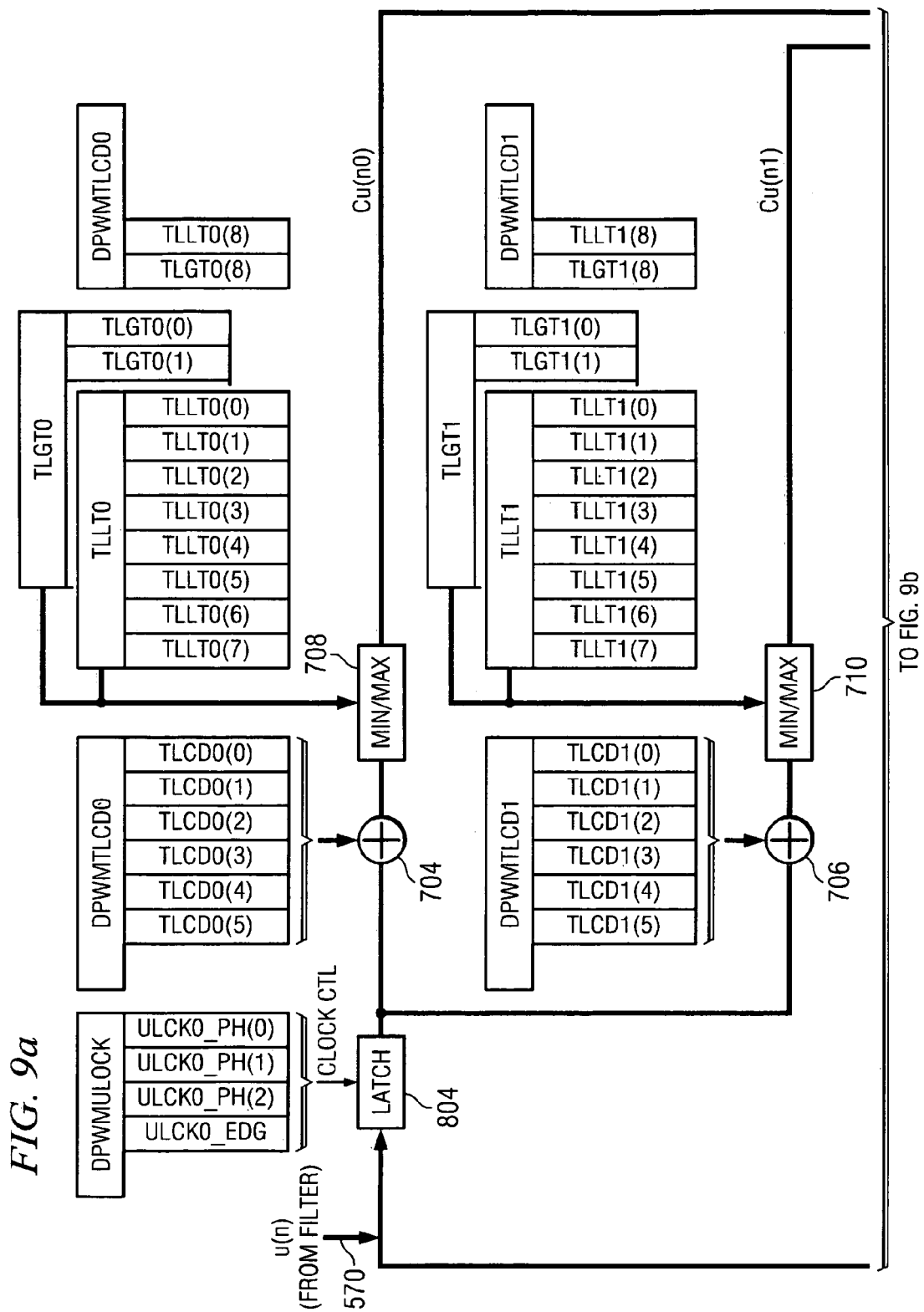
FIG. 9 illustrates a block diagram of the trim and limit sub system.
Figure 9B:
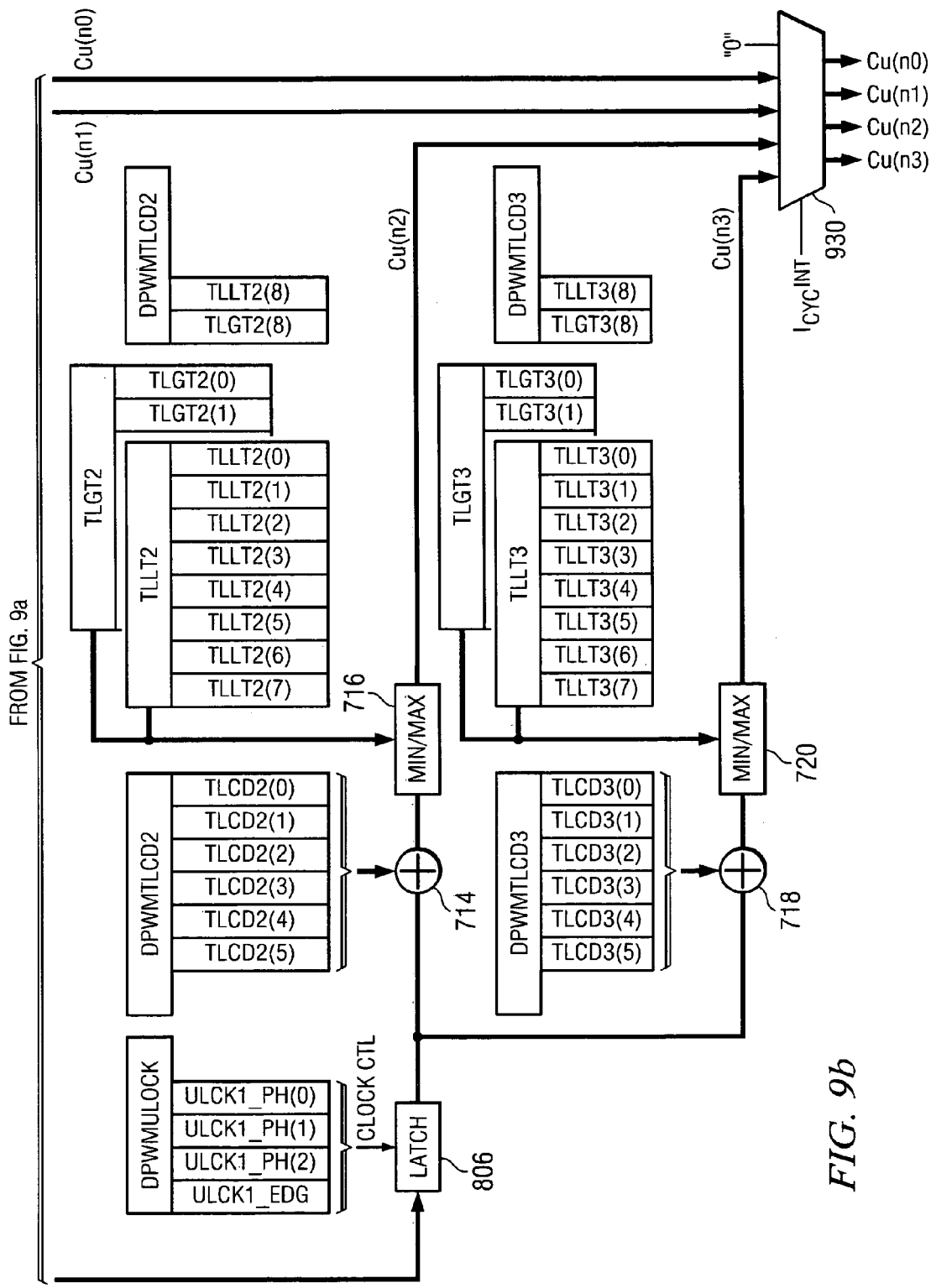

Referring now to FIG. 9, there is illustrated a more detailed diagram of the trim and limit sub-system, illustrating the registers and how they interface with various function blocks. The trim and limit sub-system enables the system management processor to minimum and maximum limits and or bias each u(n). The u(n) output of the symmetry lock logic 702 is applied to a two's complement adders 704, 706, 714, 718. The two's complement adders 704, 706, 714, 718 provide the means to apply a positive or negative offset to each u(n) value by writing the offset value to the trim-and-limit correction data register (DPWMTLCDn). This would provide the ability, for example, to positively or negatively adjust the dead time between two phase output signals. The min/max logic 708, 710, 716, 720 determines the min/max range of each adder output is within the limiter settings on the associated low limit register (TTLTn) and high limit register (TLGTn). A multiplexer 930 is operable to be disposed between each of the outputs of the limiters 708, 710, 716 and 720 for forcing the operand to "0" such that the duty cycle of the output PH1-PH6 will be terminated when ICYC IRQ happens. This provides protection to the system from exposure to long term over current conditions. Note that, although the multiplexer 930 is illustrated as a single multiplexer, there is actually a separate multiplexer for each cu(n) output.

Figure 10:
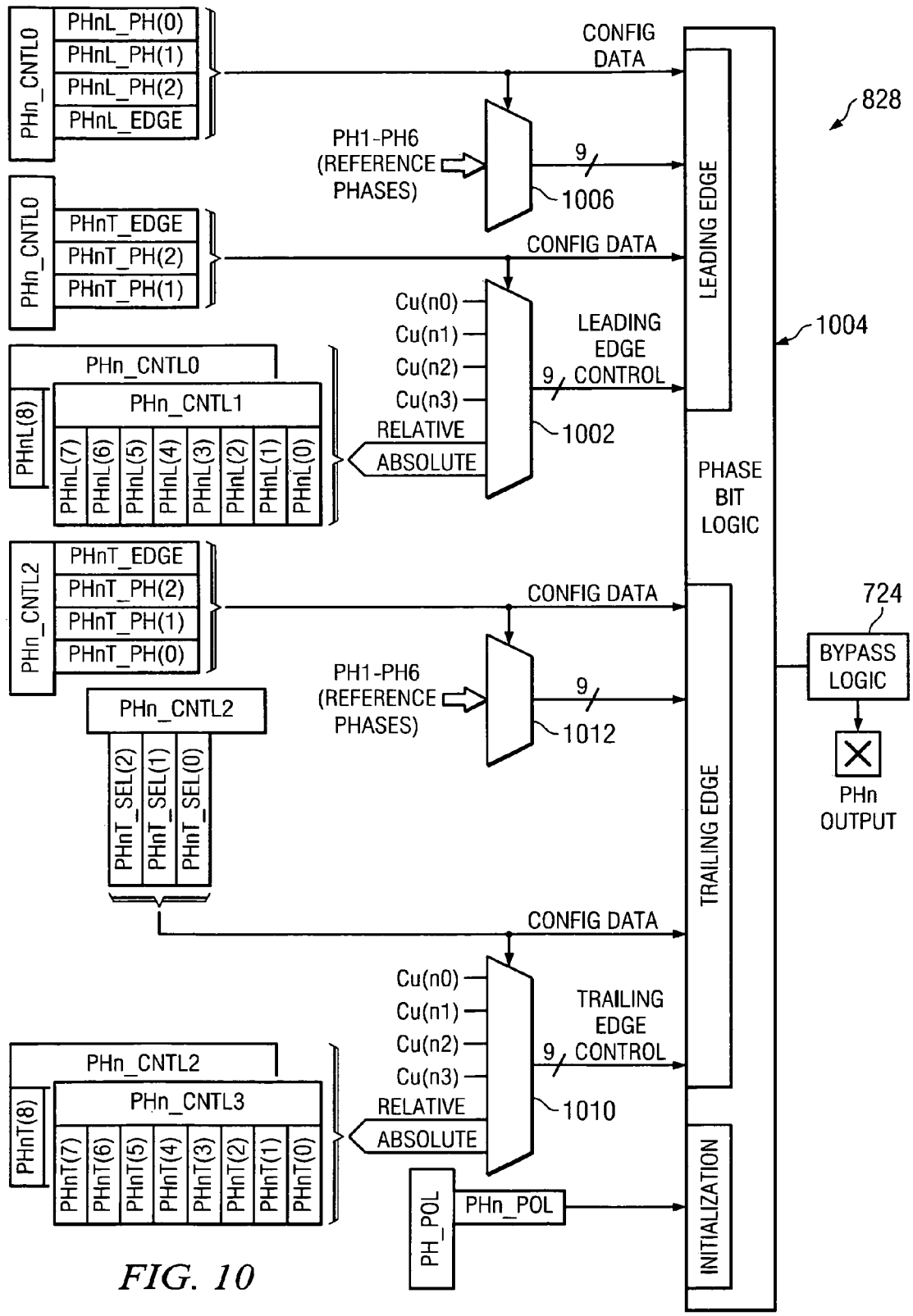
FIG. 10 illustrates a block diagram of the DPWM timing register program model.

Referring now to FIG. 10, there is illustrated a more detailed block diagram of the pattern generator 828 for one of the phases. The timing of each PHn output is controlled by the programmed settings in the control registers PHn_CNTL0 through PHn_CNTL3. Each phase output is allowed to have a maximum of two transitions per switching cycle. Programming the DPWM consists of initializing the control registers, then programming the leading and trailing edge control registers for each PHn output that is used in the application. In this way, the dead times between control signals of complementary switches may be programmed using the pattern generators 828 as described below. Each of the phase generators is divided into two sections, one for processing the leading edge and one for processing a trailing edge. As will be described herein below, each phase generator is based upon a leading or trailing edge. It is the generation and positioning of this edge that is handled by the state machine. Each edge is associated with a specific timing type. The timing type is an absolute time, wherein edge is defined as one that unconditionally occurs at a specific time-tick. Relative time is associated with an edge that occurs a prescribed time after its reference edge transitions. For example, normally PH1 has a leading edge that occurs at time-tick #1 with a pulse width that is defined as a finite value of the u(n). The leading edge of PH2 is a relative edge, in some power converters, wherein the leading edge thereof occurs a number of time-ticks after the falling edge of PH1. Another is hardware modulation timing, which is associated with an edge that occurs at a time specified by the value of one of the four corrected u(n) modulation terms.

Each of the leading edge and trailing edge functionalities have associated therewith a portion of the multiplexer 826. The leading edge portion has a multiplexer 1002 associated therewith which is operable to select one of the four corrected u(n) values, or a "relative" or a "absolute" input. These inputs are provided by the PHn_CNTL as one register for the lowermost eight bits and a ninth bit from the PHn_CNTL0 register. These are SFR control registers. This provides a leading edge control value for the leading edge portion. Configuration data is provided that is the select input to the multiplexer 1002 and is provided by the three lowermost bits of a PHn_CNTL0 SFR. The information in these three bits is also input, along with the output of the multiplexer 1002, to a phase bit logic block 1004 that is operable to carry out the operations associated with defining the leading edge and defining the trailing edge. Thus, a control value is what is provided by the multiplexer 1002. The reference phases are provided by multiplexer 1006 that selects between one of the six phases as a reference phase in the event that this is a relative edge created. This multiplexer is controlled by the four lowermost bits of the PHn_CNTL0 SFR.

The trailing edge is handled in a similar manner to the leading edge in that a multiplexer 1010 is provided for receiving the four corrected u(n) values and also Relative and Absolute inputs from the PHn_CNTL3 control register and the eighth bit from the PHn_CNTL2 register. This provides a trailing edge control. A multiplexer 1012, similar to the multiplexer 1006, selects one of the PH1-PH6 phases as the reference phase when a relative edge is being generated, and this is controlled by the four lowermost bits of the PHn_CNTL2 register.

The contents of the PHn_CNTL0 and CNTL2 registers is set forth in Tables 1 and 2.

TABLE 1

PHn_CNTL0: Phase n Leading Edge Control Register 0

Bit 7 PHnL(8): PHn Leading Edge Timing Data Bit 8
   This is bit 9 (MSB) of the PHn_CNTL1 register
Bit 6-4 PHnL_SEL2 - 0: Phase 3 Leading Edge Control Bits
   000: PHn Leading Edge Timing Determined by u(n)0
   001: PHn Leading Edge Timing Determined by u(n)1
   010: PHn Leading Edge Timing Determined by u(n)2
   011: PHn Leading Edge Timing Determined by u(n)3
   100: PHn Leading Edge Timing is Relative to Another Timing Edge
   101: PHn Leading Edge Timing is Relative to Another Timing Edge
   110: PHn Leading Edge Timing is Relative to Another Timing Edge
   111: PHn Leading Edge Timing is Absolute
Bit 3 PHnL_EDGE: Relative Training Reference Edge Leading/Trailing Edge Select
   0: Relative Timing is Referenced to Leading Edge
   1: Relative Timing is Referenced to Trailing Edge
Bit 2-0 PhnL_PHn - 0: PHn Leading Edge Relative TABLE 1-continued PHn_CNTL0: Phase n Leading Edge Control Register 0

Timing Reference Edge
   001: PHn Leading Edge Timing Relative to PH1
   010: PHn Leading Edge Timing Relative to PH2
   011: PHn Leading Edge Timing Relative to PH3
   100: PHn Leading Edge Timing Relative to PH4
   101: PHn Leading Edge Timing Relative to PH5
   110: PHn Leading Edge Timing Relative to PH6

TABLE 2

PHn_CNTL2: Phase n Trailing Edge Control Register 2

Bit 7 PHnT(8): PHn Trailing Edge Timing Data Bit 8
   This is bit 9 (MSB) of the PHn_CNTL1 register
Bit 6-4 PHnT_SELn - 0: Phase 2 Trailing Edge Control Bits
   000: PHn Trailing Edge Timing Determined by u(n)0
   001: PHn Trailing Edge Timing Determined by u(n)1
   010: PHn Trailing Edge Timing Determined by u(n)2
   011: PHn Trailing Edge Timing Determined by u(n)3
   100: PHn Trailing Edge Timing is Relative to Another Timing Edge
   101: PHn Trailing Edge Timing is Relative to Another Timing Edge
   110: PHn Trailing Edge Timing is Relative to Another Timing Edge
   111: PHn Trailing Edge Timing is Absolute
Bit3 PHnT_EDGE: Relative Training Reference Edge Leading/Trailing Edge Select
   0: Relative Timing is Referenced to Leading Edge
   1: Relative Timing is Referenced to Trailing Edge
Bit 2-0 PHnT_PHn - 0: PHn Trailing Edge Relative
Timing Reference Edge
   001: PHn Trailing Edge Timing Relative to PH1
   010: PHn Trailing Edge Timing Relative to PH2
   011: PHn Trailing Edge Timing Relative to PH3
   100: PHn Trailing Edge Timing Relative to PH4
   101: PHn Trailing Edge Timing Relative to PH5
   110: PHn Trailing Edge Timing Relative to PH6

Dead Time

Referring now to FIGS. 11a-11d, there is illustrated the manner in which the dead time between two switching control signals may be controlled using the programmability of the pattern generators and a corrected signal u(n) from the trim and limit circuitry. FIG. 11a illustrates a prior art configuration wherein first and second control signals for complementary switches within a power supply are both turned off from a time period between time $t_2$ and time $t_3$. The rising edge at $t_3$ is determined with respect to the falling edge at $t_2$. This time period is referred to as the dead time (DT). Within prior art analog control systems, this dead time is adjustable only as to controlling a delay between the generation of the trailing edge of $\phi 1$ and the leading edge of $\phi 2$, but the trailing edge of $\phi 2$ referenced to the beginning of the switching cycle can never occur prior to the trailing edge of $\phi 1$. However, utilizing the DPWM controller described herein above with respect to FIGS. 7-10, a microprocessor may program the output of the two phase control outputs to enable the dead time between times $t_2$ and $t_3$ to be increased, decreased, or even made negative.

Referring now to FIG. 11b, there is illustrated a situation wherein the trailing edge of a first control signal $\phi_1$ is generated responsive to a corrected signal u(n). In response to the signal $u(n)_1$, the control signal $\phi_1$ goes low at time $t_2$, this occurring when the correct value of the master counter for the DPWM equals $u(n)_1$. The leading edge of the control signal $\phi_2$ is responsive to the corrected signal C(u(n)) which equals u(n) plus some offset value set by the trim and limit amount. The leading edge of control signal $\phi_2$ is programmed responsive to its associated control registers and the corrected u(n) signal such that it will have its leading edge go high when u(n) plus or minus some value x equals the count value of the master DPWM counter at time $t_3$. Thus, for example, the leading edge of control signal $\phi_2$ can be configured to go high five clock cycles after the $\phi_1$ signals goes low at $t_2$.

The advantage of the DPWM controller described with respect to FIGS. 7-10 is that it enables the point at which the leading edge of control signal $\phi_2$ goes high at time $t_3$, and thus the dead time to be programmably adjusted independently of the trailing edge of control signal $\phi_1$. Thus, the value of x may comprise any positive or negative value adjusted by the offset adders in the trim and limit circuitry. If the value x comprises a negative value, the situation as illustrated in FIG. 11c occurs. In this case, the first control signal $\phi_1$ is a function of u(n) as before with the trailing edge going low at time $t_3$. However, in this case the dead time between the trailing edge of control signal $\phi_1$ and the leading edge of control signal $\phi_2$ is negative such that the leading edge of control signal $\phi_2$ goes high at time $t_2$ before the trailing edge of control signal $\phi_1$ goes low at time $t_3$. The ability of the leading edge of control signal $\phi_2$ to go high at a time prior to trailing edge of control signal $\phi_1$ going low is not available within previous analog or digital systems. In previous analog or digital systems the control of the leading edge control signal $\phi_2$ was always responsive to the trailing edge of control signal $\phi_1$ occurring at time $t_3$. Since control signals $\phi_1$ and $\phi_2$ are programmed independently of each other with separate and individual finite state machines, the leading edge of control signal $\phi_2$ may go high at any point in time. This is useful in situations wherein complementary switches of a switched power supply have different switching times associated therewith, and the switch associated with signal $\phi_2$ takes longer to reach its steady state operating condition.

Thus, as illustrated in FIG. 11d, a second control signal $\phi_2$ may have its leading edge independently programmed from the trailing edge of the first control signal $\phi_1$ such that the dead time between the trailing edge of control signal $\phi_1$ and the leading edge of control signal $\phi_2$ maybe adjusted in a positive direction from $t_3$ to $t_4$ or in a negative direction from time $t_3$ to time $t_2$ and referenced to the beginning of the switching cycle, or to any other edge in the system other than the trailing edge of $\phi1$, the edge relating to the dead time requirement.

Figure 12:
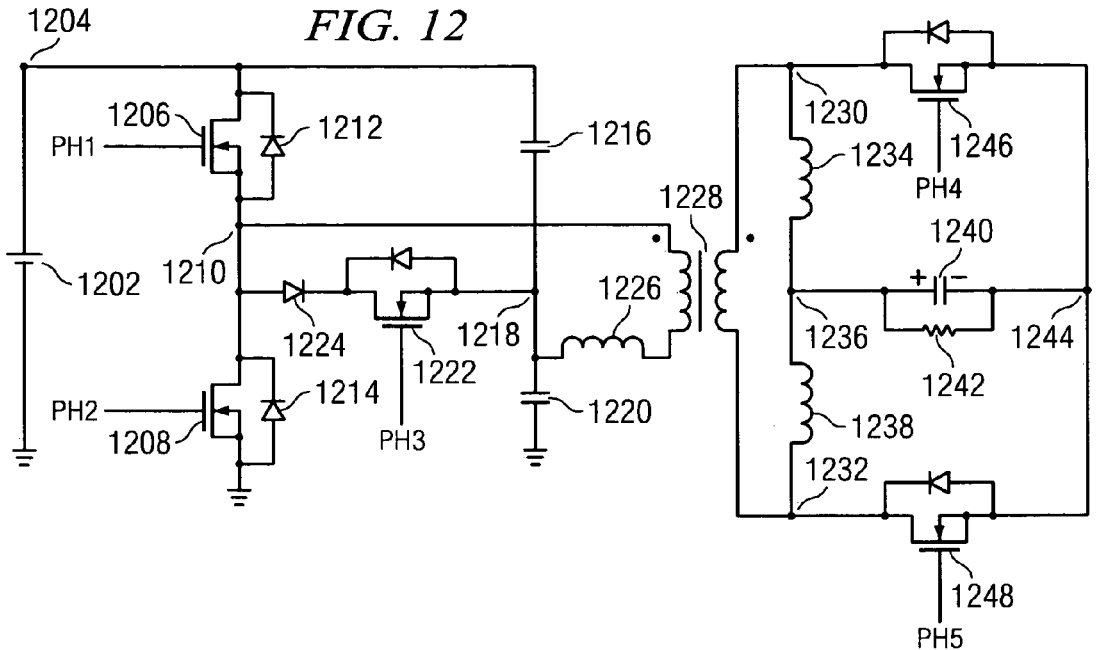
FIG. 12 is a schematic diagram of a multi-purpose switched power circuit.

Referring now to FIG. 12, there is illustrated a schematic diagram of a multiphase switched power supply wherein the programmable nature of the phased outputs will enable controlling of the dead times between switches on the primary side and the secondary side. The primary side of the switched power supply includes a DC supply 1202 connected between node 1204 and ground. A pair of switching transistors 1206 and 1208 are connected between node 1204 and ground. The drain/source path of transistor 1206 is connected between node 1204 and node 1210. The gate of transistor 1206 is connected to the PH1 control output. Transistor 1208 has its drain/source path connected between node 1210 and ground. The gate of transistor 1208 is connected to the PH2 control output. The body diodes 1212 and 1214 are connected across each of the transistors 1206 and 1208 respectively. A capacitor 1216 is connected between node 1204 and node 1218. Another capacitor 1220 is connected between node 1218 and ground. A third switching transistor 1222 has its source/drain path connected between node 1218 and the anode of diode 1224. The gate of transistor 1222 is connected to the PH3 control output. The cathode of diode 1224 is connected to node 1210. Inductor 1226 is connected between node 1218 and one input of the primary side of power transformer 1228. The second input of the primary side of power transformer 1228 is connected to node 1210.

The secondary side of power transformer 1228 is connected between nodes 1230 and 1232. A first inductor 1234 is connected between node 1230 and node 1236. A second inductor 1238 is connected between node 1236 and node 1232. A capacitor 1240 is connected in parallel with a resistor 1242 between node 1236 and node 1244. A fourth switching transistor 1246 has its source/drain path connected between node 1244 and node 1230. The gate of transistor 1246 is connected to the PH4 control output. A fifth switching transistor 1248 has its source/drain path connected between node 1244 and node 1232. The gate of transistor 1248 is connected to the PH5 control output.

Referring now to FIG. 13, there is illustrated a timing diagram for the phase control signals applied to each of the switching transistors of the switched power supply illustrated in FIG. 12 by way of example. In this case, it is desired to control the dead time between the phase control signals PH1 on the primary side of the switched power supply and PH4 on the secondary side of the switched power supply due to switching delays within the switching transistors and across the power transformer. The control signal PH1 has a leading edge occurring at time $t_1$ and a trailing edge occurring at time $t_3$. The distance between the leading edge of time $t_1$ and the trailing edge at time $t_3$ is a function of the u(n) value determined by the filter and the trailing edge occurs when the count value between the leading and trailing edges is equal to u(n). The leading edge of the PH1 control output at the time $t_1$ is an absolute edge occurring at a defamed count value of the master DPWM clock from the beginning of the switching cycle. The control signal PH2 has a leading edge occurring at time $t_4$ which is relative distance from the falling edge of signal PH1 at time $t_2$ of a predetermined number of clock cycles of the master clock. The trailing edge of the PH2 control signal occurs at time $t_6$, and is a function of the u(n) signal. (It is noted that u(n) continually changes and, thus, a counter counts the number of clock cycles from the time $t_4$ until the count value equals the instantaneous value of u(n) at time $t_6$.) The leading edge of the PH3 control output occurs at time $t_5$, and is a relative edge to the leading edge of the PH2 control output occurring at $t_4$. The trailing edge of the PH3 control signal occurs at time $t_8$, and is an absolute edge always occurring at the same defined point in a frame, i.e., at the end of the switching cycle. The leading edge of the PH4 output is an absolute edge occurring at time $t_0$ in a frame, i.e., the beginning of the switching cycle with an absolute value of "0". The trailing edge of the PH4 output occurs at time $t_3$, and has a dead time period from the trailing edge of PH1 occurring at time $t_2$. In this case, the dead time is established by generating the trailing edge of the PH4 control output at time $t_3$ and dependent upon the value of u(n) plus some defined offset value. By establishing this offset in conjunction with the value of u(n)$_1$ a set dead time may be established, since the PH4 output edges and PH1 output edges are both dependent on u(n). Since both are dependent on u(n), the edges may be generated independently with a defined positive or negative off set. With respect to the PH5 control output its leading edge occurs at time $t_3$, and is a relative edge to the trailing edge of the PH1 control output occurring at time $t_2$ by a final number of cycles. A dead time period between the leading edge of the PH2 control output and the trailing edge of the PH5 output occurring at time $t_7$ is established by generating the trailing edge at time $t_7$ in such a manner that it is dependent upon the u(n) signal plus some off set value, but referenced to the PH2 control output rising edge. In this case, the trailing edge of the PH5 control output at $t_7$ will always be different from the falling edge of the PH2 output by the established off set since both signals are generated based upon u(n) and both are a fixed number of clock cycles delayed from the trailing edge of PH1. By making the leading or trailing edges of signals dependent of the u(n) signal plus or minus some off set, a programmable dead time may be established between various phase output control signals. As such, the trailing edge of PH5 is based on the leading edge of PH2 as a reference edge that sets a reference count value and then the value of u(n) +/− an offset is added thereto such that, when the master counter equals the is equal to $PH2_{LE}$+u(n) +/− offset, then the trailing edge of PH5 will be generated.

Figure 14:
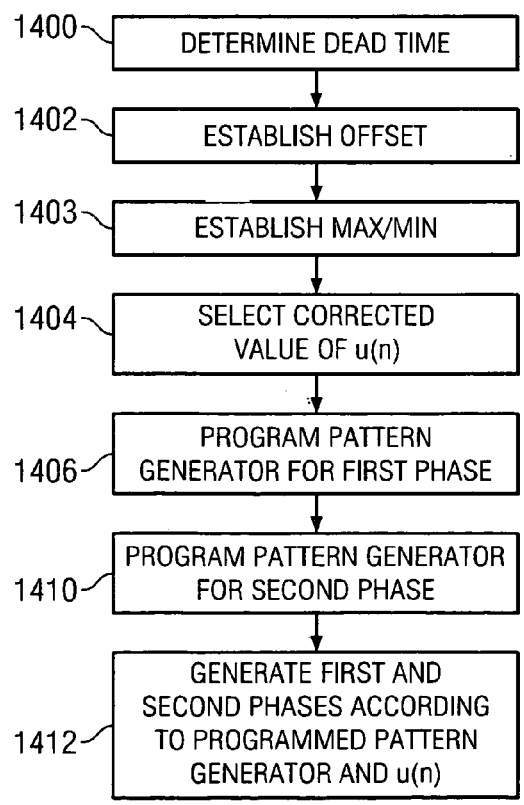
FIG. 14 is a flow diagram illustrating the method for establishing a dead time between phase output.

Referring now to FIG. 14, there is illustrated a flow diagram describing the manner in which the dead time between a first and a second phase control signal output may be established. Initially, at step 5500, the desired dead time to occur between the first and second phase output control signals is determined. The requirements for a pair of corrected values of u(n) are established within the trim and limit circuitry in the manner described previously with respect to FIGS. 9a and 9b. A desired positive or negative offset may be applied at step 1402 to one u(n) signal to establish the dead time period for a corrected u(n) signal. A second corrected u(n) signal is established without the offset. The minimum and maximum ranges are established at step 1403 for each corrected u(n) signal in accordance with the low limit registers and the high limit registers as described with respect to FIGS. 9a and 9b. The trim and limit circuitry provides a number of corrected values of u(n), and the desired corrected values of u(n) are selected at step 1404.

Using first selected value of u(n) without an offset and the established control values within the control register for a particular phase output, the pattern generator for a first phase output and either the leading or trailing edge is programmed at step 1406 to generate the control phase output edge in a desired manner. The control values are used along with the value of u(n) to create a leading edge and a trailing edge at desired locations in a frame, each potentially independent of the other. This process is more fully described with respect to FIGS. 7-10. Using the desired dead time, a pattern generator for the second phase output signal is programmed at step 1410 using a second corrected value of u(n) having the necessary offset included therein and the necessary control values within the control register for the leading and trailing edges of the second phase output. The control values for the trim and limit circuit and the control registers are provided by the controlling microprocessor. Once the desired control values are set within the control registers for the first phase output and the second phase output, the leading and trailing edges for the first and second phase outputs are each independently generated at step 1412 using the programmed pattern generators and the corrected value of u(n). This will provide the first and second control signals having a dead time between the control signals programmed to a desired value.

Finite State Machine

Figure 15:
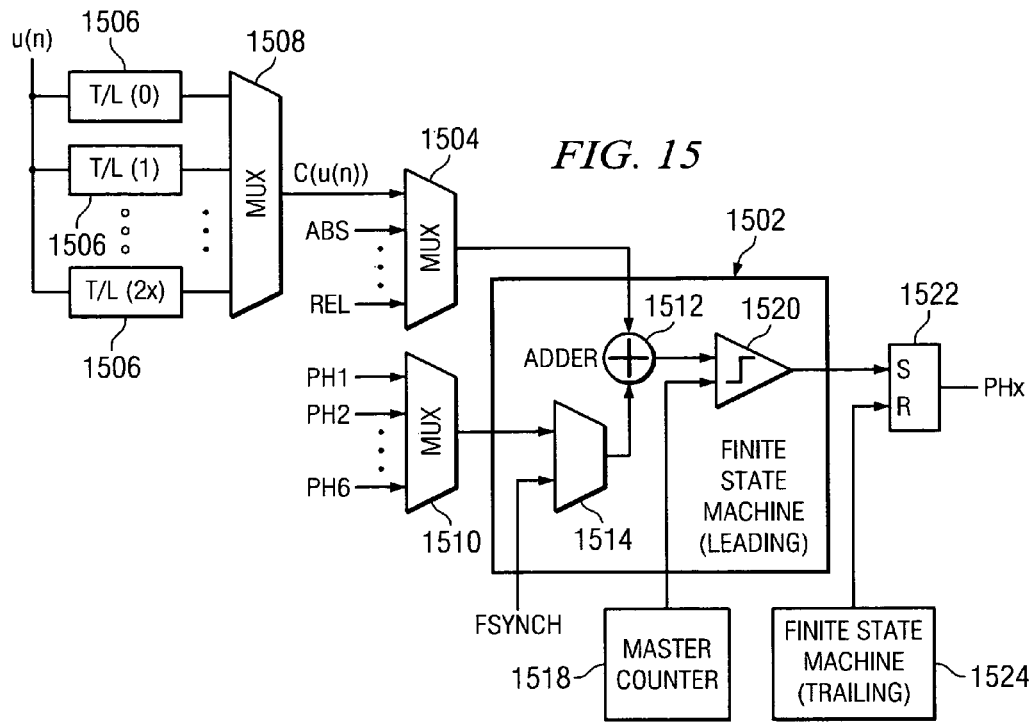
FIG. 15 illustrates a more detailed block diagram of one pattern generator for a single phase illustrating the operation of the associated finite state machine for a given edge of a particular phase output, either the leading edge or the trailing edge.

Referring now to FIG. 15, there is illustrated a more detailed diagrammatic view of a portion of a pattern generator for the generation of a single edge associated with generating a particular phase control output. As noted herein above, each phase output is comprised of a leading edge and trailing edge, this leading edge being either rising or falling and the trailing edge either falling or rising, respectively. The embodiment of FIG. 15 is for a single edge in a single phase, wherein the embodiment of FIG. 10 illustrates the generation of both the leading and trailing edge for a given phase output. Essentially, the leading edge operation and the trailing edge operation are logically OR'ed together to provide an output phase control signal for a given switching device.

In general, each edge for each phase control output is generated utilizing a finite state machine (FSM). This finite state machine is noted with a reference numeral 1502. As noted in FIG. 10 and the description associated therewith, there are multiple inputs that are provided to the finite state machine. There is provided an operand value from a multiplexer 1504, that being similar to multiplexers 1002 and 1010, these being the primary edge control. The operand is selected to either be the number of counts associated with the duty cycle, u(n), the fixed value of counts representing an absolute value or a fixed number of counts representing relative value. The absolute and relative counts are derived from the registers PHn_CNTL1/3, as set forth in FIG. 10. These are 9-bit values. The u(n) value is the value that is determined at the control loop and represents the number of counts for the width of PH1. This is effectively the number of counts that PH1 is active high and allows current to be passed to the inductive element. The duty cycle is equal to u(n) divided by the total count for a given frame, which total count for a given frame represents the length of the switching cycle in counts of a master counter. The master count is initiated upon the initiation of a particular switching cycle and it is incremented by the master clock. This switching cycle has a fixed number of counts.

As noted herein above, the value of u(n) determined through the loop controller and output by the PID can be corrected by the trim and limit circuitry to provide a positive or negative offset. Therefore, the uncorrected u(n) is input to one of multiple trim and limit circuits 1506, one potentially for each edge, such that if there are "x" phases, there could potentially be "2x" trim and limit circuits. In the circuit illustrated in FIG. 7, there are only four trim and limit circuits provided, it being understood that more could be utilized. Thus, each edge can independently be determined utilizing a value of u(n) that is either increased by a positive offset or decreased in value by a predetermined negative offset without reference to the generation of other edges by the finite state machines associated with the other edges. The finite state machine 1502 selects the output C(u(n)) one of these trim and limit circuits 1506 for use therewith by a multiplexer 1508, it being understood that each trim and limit circuit 1506 can have a different and programmable offset associated therewith. This provides the corrected value C(u(n)). The multiplexer 1504 selects this input if the edge associated therewith is to be based upon this potentially corrected value. The other input that is provided, as set forth with respect to the multiplexers 1006 and 1012 of FIG. 10, is the selection of an edge control from another phase generator, i.e., the generation of another edge in the system. This is provided by a multiplexer 1510 and provides the frame of reference for the associated edge. This selects between one of the multiple phase edges, it being a leading or a trailing edge. Additionally, the initial edge of the switching cycle will be provided by an FSYNCH signal. Essentially, this is a zero count value of the master counter at the beginning of the switching cycle.

As described herein above with reference to FIG. 10, finite state machine 1502 is operable to generate an edge based upon an absolute value of counts from the initiation of the switching cycle, a fixed number of counts relative to another edge in the system, this being a relative value, or a number of counts based upon the u(n) value. Thus, the edge generation is either absolute, relative or u(n). This u(n) value based decision, when selected, determines a count value from either the beginning of the switching cycle or another edge generated in the system. Each of these will be described herein below.

Inside the finite state machine 1502, there is provided an adder 1512. The adder 1512 is operable to add the value of the operand, which constitutes a count value with the value of the selected phase from the multiplexer 1510 or an external beginning of switching frame signal referred to as FSYNCH. This is facilitated with a multiplexer 1514. Therefore, the actual reference is provided out of the multiplexer 1514 from which the operand is to count. This reference represents a count value within the switching frame for either the occurrence of one of the edges in one of the phases or an external pulse, which represents the "0" count of the master counter represented by block 1518. Therefore, the adder will provide on the output thereof the desired count value. This is compared in a comparator 1520 to the count value of the master counter which, as described herein above, is reset at a value of "0" at the beginning of a switching cycle. By adding the count value output by the multiplexer 1504 to the reference phase, this count value output by the multiplexer 1504 basically provides an additional count to that already provided by the output of multiplexer 1510 such that this output of the multiplexer 1510 provides a reference or "normalized" count value. When the desired count value output by the adder 1512 is equal to the master counter output, the output of the comparator 1520 will go high representing the generation of an edge. This is input to a set/reset latch 1522 which is associated with each phase control signal, PHx. This provides the appropriate edge on the output. This latch 1522,is controlled such that it is biased one direction or the other, i.e., it will be a rising edge or a falling edge on the output thereof. This merely requires inverting the value thereof. This is provided by one of the control signals in the register such that the leading edge will either be a high going edge or a low going edge. The finite state machine 1502 represents the "leading" edge of the particular phase control output. The other edge, the trailing edge, of the phase control output is provided through a substantially identical finite state machine 1524 which is connected to the reset input of the latch 1522. Thus, each edge is independently generated and then combined with the latch 1522 in order to provide a "state change" from an initial state to a second state with a leading edge and then back to the initial state with a trailing edge. Each of the finite state machines 1502 and 1524 associated with the associated phase control signal operate independently and are each programmable such that the output of the multiplexer 1504 associated with finite state machine 1502 and the corresponding multiplexer associated with finite state machine 1524 can independently select the type of edge that is generated and the multiplexer 1510 and corresponding multiplexer in the finite state machine 1524 can select the reference edge or count of the master counter from which the count is calculated. Each of the finite state machines 1502 and 1524 have a self contained adder 1512 and comparator 1520 for determining when the edge is to be generated. All the finite state machines for each of the phase control signals operate off of the master counter 1518.

Figure 16A:
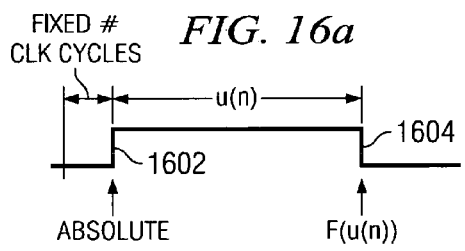
FIGS. 16a-16d illustrate timing diagrams for various methodologies for generating an edge.
Figure 16C:
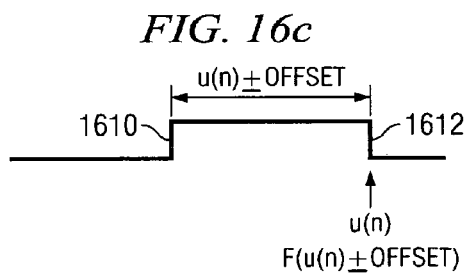
Figure 16B:
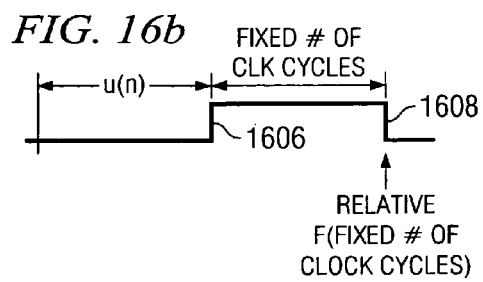

Referring now to FIGS. 16a-16b, there are illustrated diagrams for each of the edge generation decisions for respective edge generated. Specifically, FIG. 16a illustrates the generation of an edge based upon either Absolute value or a u(n) value. This wave form requires generation of both a leading and a trailing edge for PH1. There will typically be a fixed number of clock cycles before the generation of a leading edge 1602. This can be a value of "0" or it can be a fixed number of clock cycles. It may be desirable to actually utilize a fixed number of clock cycles for this. After the generation of the leading edge, this being the Absolute edge decision for the leading edge of PH1 the trailing edge is the next edge that has to be generated. It should be understood that this edge is generated independently of the leading edge 1602. The trailing edge is indicated by a reference numeral of 1604. This edge is a function of u(n). It is generated from the absolute edge 1602 or from the beginning of the switching cycle if the absolute value of the leading edge is "0." Thus, the number of counts represented by the output of the loop filter for u(n) determines when the edge 1604 will be generated. In general, the value of u(n) is a varying value output by the filter. Thus, it is possible that this value can vary from the beginning of the switching cycle to the generation of the edge 1604. Basically, the finite state machine 1502 that is associated with the trailing edge 1604 will determine when the edge 1604 will be generated. This is facilitated by comparing a count value of the master DPWM counter with the desired count value at the output of the adder 1512, which is representative of a normalized count value at the edge 1602, and, when it equals u(n), the edge 1604 is generated.

Referring now to FIG. 16b, there is illustrated an edge generated using the relative input value stored in the register and selected by the multiplexer 1504. In this embodiment, the pulse generated has a rising edge 1606 that is the trigger edge, this also being the leading edge. This is generated, in this illustration, by an independent finite state machine that generates edge 1606 at a count value of u(n) from the start of the switching cycle. However, an edge 1608, the trailing edge associated with leading edge 1606, is generated a fixed number of cycles after leading edge 1606. Thus, to define this edge 1608, it is only necessary to store the relative value and the edge to which it is referenced, this edge being any edge in the system.

Referring now to FIG. 16c, there is illustrated an edge generated utilizing the value of u(n) but generating this relative to another edge. Further, this is generated not only with the value of u(n), but also a corrected value, by adding or subtracting an offset therefrom. The reference edge is noted as being a leading edge 1610 on the same pulse (but could be from another phase control signal). A trailing edge 1612 is generated by adding or subtracting an offset with a trim and limit circuit from the value of the u(n) measured relative to the edge 1610. Therefore, the width of this particular pulse is the C(u(n)) generated by the trim and limit circuit. Since the value of C(u(n)) is equal to u(n) +/− offset, the offset is determined by the contents of the offset register and then only modifies the value of u(n). When the normalized count value measured from the reference edge 1610 equals C(u(n)), the edge 1612 is generated.

Figure 16D:
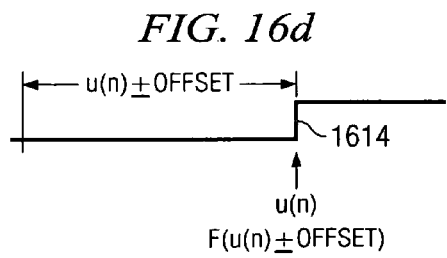

Referring now to FIG. 16d, there is illustrated a diagram showing an edge generated based upon u(n) +/− offset and based upon the start of the switching cycle as the reference edge. This is a single edge, the leading edge, 1614. It should be noted that this edge can be utilized for the dead time determination due to the fact that it is generated based upon a reference edge to which another pulse is initially referenced to when generated. This will be described herein below.

Referring now to FIGS. 17a and 17b, there is illustrated a diagrammatic view of how the dead time is determined utilizing the embodiment of FIG. 16d. In this embodiment, the initial phase, PH1, is generated by generating a leading edge 1702 from the beginning of the switching cycle by a distance equal to the value in the Absolute register, it being noted that this could be "0." The trailing edge, an edge 1706, is generated after the normalized count value from the edge 1702 has been determined to equal u(n). This was noted herein above. A second pulse generates a leading edge 1608 a predetermined amount of time from the edge 1706. The reason for this, as described herein above, is to ensure that there is some type of dead time in the conduction of one active device versus another in a complementary pair. However, as also noted herein above, it may be that, due to the parasitics in the system, the edge 1608 is required to be generated prior to edge 1706. The edge 1608 is generated not based upon the edge 1706 but based upon a corrected u(n) value reference to the edge 1702, i.e., the same as was the case for the edge 1706. Thus, even though the dead time is important to be determined between the edge 1706 and the edge 1608, the edge 1608 is generated from another reference than that to which it is actually desirable to be relative to. Since both are relative to the same reference edge, they are essentially related edges. However, in certain situations, as noted herein above, it may be desirable that the edge 1608 occurs before the edge 1706. If this is the case, it is difficult to do that in an analog situation wherein one edge is generated from another, i.e., they are pipelined. With the offset actually being a negative value such that the corrected value of u(n) can be less than u(n), then this edge 1608 can be generated prior to the edge 1706. This is illustrated in FIG. 17*b* wherein the edge 1608' is generated prior to the edge 1706.

Referring now to FIG. 18, there is illustrated a flow chart depicting the generation of a Relative edge. This is initiated at a block 1802 and then proceeds to decision block 1804 to determine if a reference edge has been generated to which the relative edge is related. When this occurs, the program will flow to a function block 1806 to fetch the contents of a relative edge, this, as noted herein above, being a 9-bit fixed value. The program then flows to a function block 1808 to normalize the count value. (Note that this is just to provide a frame of reference). As noted herein above, the master counter is initiated at the beginning of the switching cycle. The count value is normalized at the reference edge, such that this now becomes the virtual "0" count value. The program then flows to a decision block 1810 to determine if the normalized count, i.e., that from the reference edge, is equal to the value of the Relative register. When this occurs, the program flows to a function block 1812 to generate the edge and then to an End block 1814.

Referring now to FIG. 19, there is illustrated a flow chart depicting the generation of the Absolute edge, which is initiated at a block 1902. The program then flows to a decision block 1904 to determine if the master DPWM counter value associated with the start of the switching cycle has occurred. The master DPWM counter is reset at the beginning of the switching cycle. As noted herein above, the Absolute operational mode is a mode wherein the count value is measured from the edge of the initiation of the switching cycle. When the switching cycle has been initiated, the program will flow along a "Y" path to a function block 1906 to fetch the contents of the Absolute register. The program then flows to a function block 1908 to determine if the count value, this not being a normalized count, is equal to a register value. When this occurs, the program flows to a function block 1910 to generate the edge and then to an End block 1912.

Figure 20:
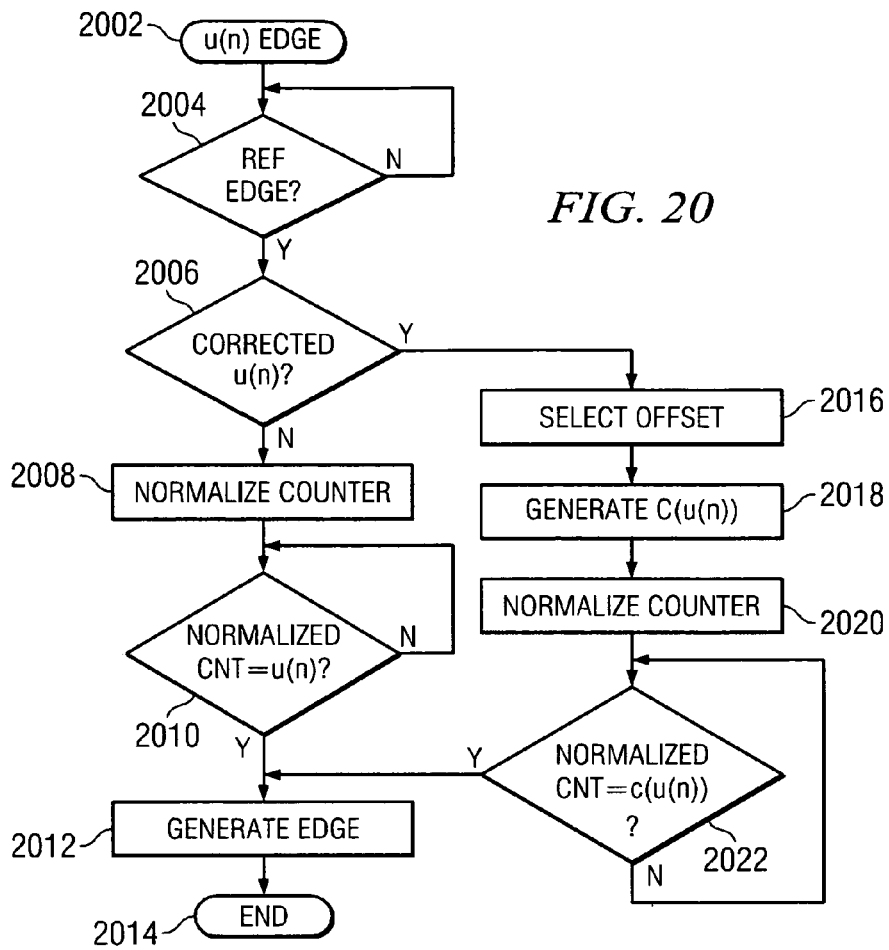
FIG. 20 illustrates a flow diagram depicting the operation of generating the U(n) edge.

Referring now to FIG. 20, there is illustrated a flow chart depicting the operation of generating a u(n) related edge, which is initiated at a block 2002 and then proceeds to a decision block 2004. Decision block 2004 determines when a reference edge occurs, it being noted that the u(n) based edge can be generated based upon a reference edge generated by another finite state machine, it can be generated based upon the initiation of the switching cycle, or it can be generated from another edge in the same phase control output for that associated PHx. As noted herein above, each edge is generated independently, such that each other edge in the system constitutes a potential reference edge. When this reference edge occurs, the program flows to a decision block 2006 to determine if a corrected u(n) value is to be utilized. If not, this indicates that the actual u(n) value is to be utilized, and then the program flows to a function block 2008 to normalize the counter value at the reference edge and then flows to a decision block 2010 to determine if the normalized count value determined from the reference edge is equal to the value of u(n). When this occurs, the program flows along the "Y" path to a function block 2012 to generate the edge and then to an End block 2014.

If the corrected u(n) value is to be utilized, i.e., there is to be provided an offset, the program flows along the "Y" path to the function block 2016 from the decision block 2006 to select the offset stored in the register. This if facilitated by both selecting one of the trim and limit circuits with the multiplexer 1508 and then fetching the contents of the offset register therefrom. The program then flows to a function block 2018 to generate the corrected value of u(n) and then to a function block 2020 to normalize the counter at the reference edge. The program then flows to a decision block 2022 in order to determine if the normalized count measured from the reference edge is equal to the corrected value of u(n). When this occurs, the program flows to the function block 2012 in order to generate the edge.

It can be seen that since this is a finite state machine, it takes a very small number of cycles in order to execute the operation. In general, it basically takes one cycle to determine the value and then another clock cycle in order to clock this through to the output, which is typically what is required for a gated operation.

Dead Time Operation

Figure 21:
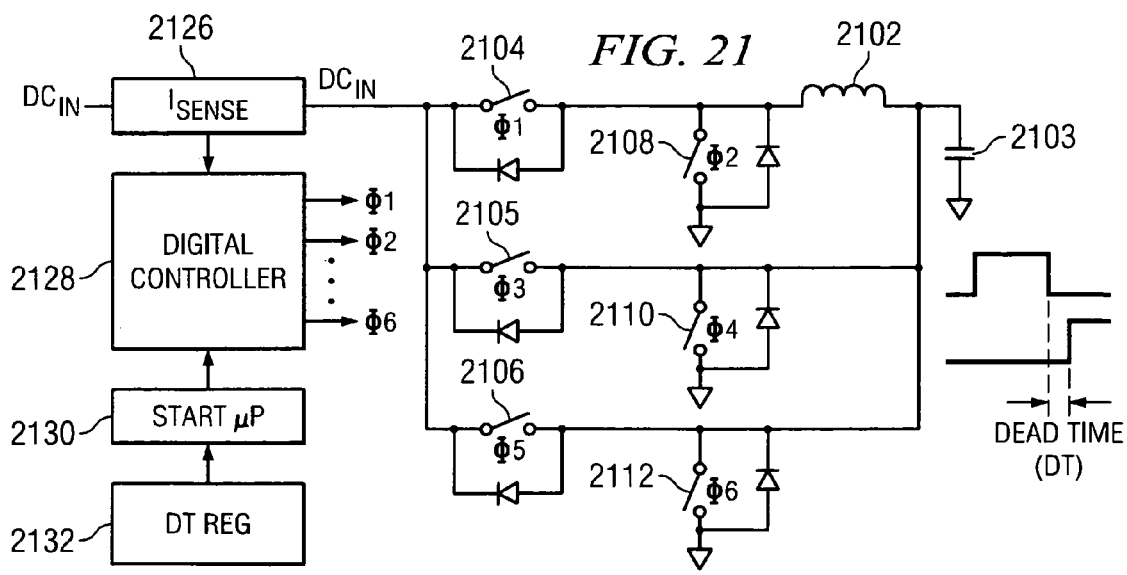
FIG. 21 illustrates a diagrammatic view of a multi-phase system for determining dead time.

Referring now to FIG. 21, there is illustrated a diagrammatic view of a dead time optimization system. This is a multi-phase system, as described herein above. For illustrative purposes, six different switches have been provided and interfaced with an inductive element 2102 that drives the capacitive element 2103. A first switch, the primary switch, driven by a phase $\phi1$, connects the input voltage to the top side of the inductor 2102, with a second switch 2108 driven by phase $\phi2$. These are complementary switches. A second set of complementary switches is provided by a switch 2105 connected between the input and the top level of capacitors 2104 with a switch and driven by phase $\phi3$ and a switch 2110 connected to ground and driven by phase $\phi4$. A third set of complementary switches is provided by a switch 2106 driven by $\phi5$ connected between the input voltage and the top of capacitor 2103 with a switch 2112 connecting the top layer of the capacitor to ground with a phase $\phi6$. These switches and their configurations are for exemplary purposes only to show three sets of complementary switches. An example of a multi-phase system is illustrated in FIG. 12.

The current input to the switch 2104 is sensed with a current sense circuit 2126, which is a Hall sensor. This is provided to a digital controller block 2128, which represents the overall digital control loop that generates the six different phases. This is controlled in part by a start-up block 2130 which is basically operable to initiate the dead time optimization routine whenever a power-up condition exists, a re-start-up condition exists or even a manual input is received for such dead time optimization. Any other reason for initiating a dead time optimization routine will be represented by the block 2130. This is typically facilitated with the micro controller. A dead time register 2132 is provided for storing the dead time value. It is noted that the user can initially set a dead time value for the purpose of configuring the overall power supply. This dead time will then be varied with the optimization routine. It can be seen from the timing diagram associated with FIG. 21 that there will be two edges represented by the complementary switches wherein one edge is desired to occur after another edge, such that one switch is turned off before another switch in a complementary pair is turned on. This was described herein above.

Figure 22:
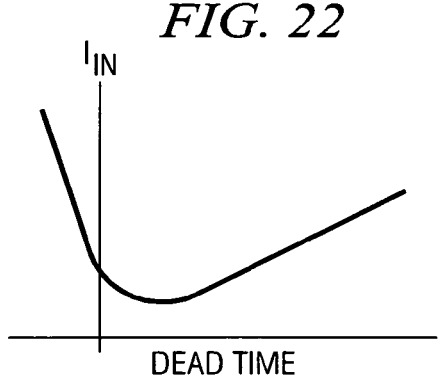
FIG. 22 illustrates a plot of a dead time versus input current.

Referring now to FIG. 22, there is illustrated a plot of dead time versus current wherein it can be seen that, as the dead time decreases, the current will increase, resulting from the one complementary switch connected to ground shunning current. Further, as the dead time increases, current will also increase due to inefficiencies. There will be a minimum current versus dead time that will occur, which is desirable from the optimization routine. This is the desirable operating mode.

Figure 23:
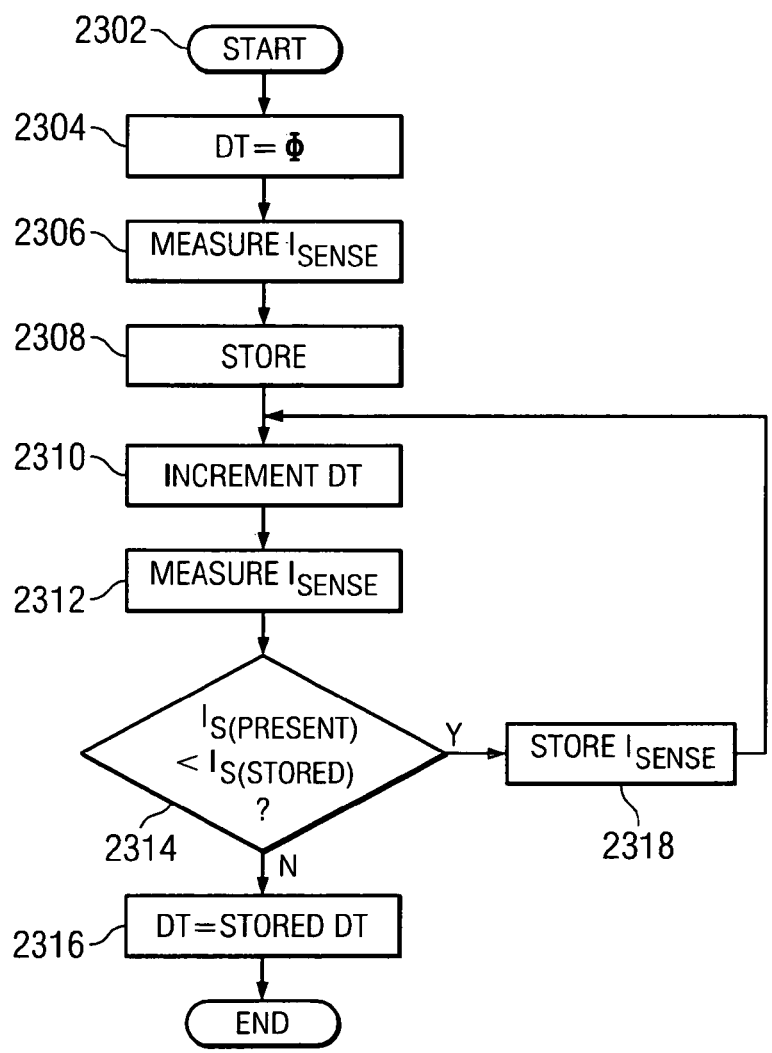
FIG. 23 illustrates a flow chart for optimizing the dead time value.

Referring now to FIG. 23, there is illustrated a flow chart depicting the optimization routine for optimizing dead time. This is initiated at the block 2302, which can be initiated, as noted herein above, through either power up, manually or restart. The program then flows to a function block 2304 wherein the initial value of the dead time is set to "0" or to some other value, even the value designated by a user. The program then flows to a function block 2306 wherein the current is measured and is stored, as noted in a function block 2308. The value of dead time is then incremented, as indicated by the function block 2310 and then the current measured, as indicated by a function block 2312. The program then flows to a decision block 2314 to determine if the present current is less than the stored current. If so, the program then flows to a function block 2318 to store the current and then back to the function block 2310 to again increment the dead time value. If the current at decision block 2314 is determined to be greater than the stored current, then the final current is the stored current from the last cycle, as indicated by block 2316. However, it is noted that this routine must be cycled through for both the negative direction and the positive direction from the initial value to determine the actual minimum.

Figure 24:
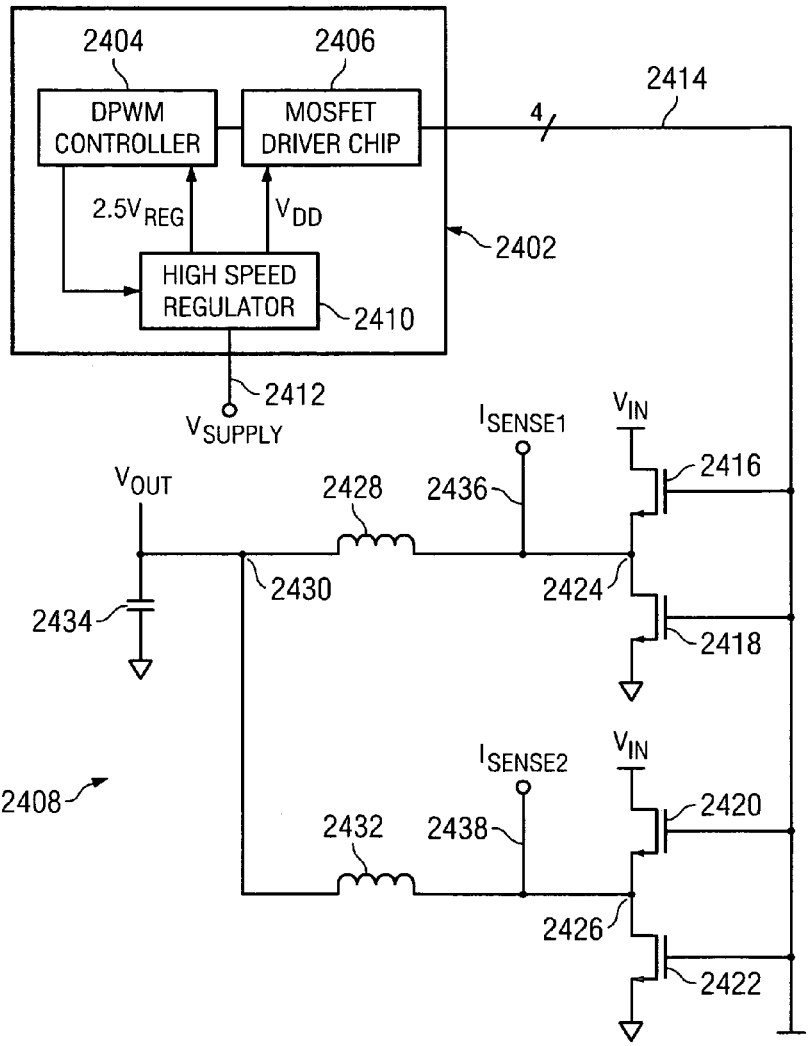
FIG. 24 illustrates the point on load configuration between a DPWM controller and a power converter circuit.

Referring now to FIG. 24, there is illustrated a point of load configuration of the present disclosure. In the point of load configuration included within a monolithic integrated circuit 2402, there is included the DPWM controller 2404 and a driver chip 2406 connected between the output of the DPWM controller 2404 and the inputs of switches of a switched power supply 2408. The DPWM controller 2404 comprises the controller described previously herein with respect to FIGS. 1-23. Providing power to both of the DPWM controller 2404 and the MOSFET driver chip 2406 is a high speed voltage regulator 2410. The high speed voltage regulator 2410 generates a 2.5 V regulated voltage to the DPWM controller 2404 and a $V_{DD}$ voltage to the MOSFET driver chips 2406. In order to improve power efficiencies within the switched power supply 2408, the voltage VDD applied to the MOSFET driver chip 2406 may be controlled responsive to a control signal to the high speed voltage regulator 2410 from the DPWM controller 2404. The high speed voltage regulator 2410 receives an input supply voltage on input 2412.

The driver chip 2406 may in a preferred embodiment comprise a driver chip constructed from MOSFET circuits. However, other manufacturing techniques for constructing the driver circuits connected to the inputs of the switches of the switch power supply 2408 may also be utilized. In the configuration illustrated in FIG. 24, the driver chip 2406 provides four output lines 2414 of the driver chip 2406 each connected to one of power switches 2416, 2418, 2420 and 2422. Transistor 2416 has its source-drain path connected between the input voltage $V_{IN}$ and node 2424. Transistor 2418 has its source-drain path connected between node 2424 and ground. Switching transistor 2420 has its drain-source path connected between the input voltage $V_{IN}$ and node 2426. Transistor 2422 has its source-drain path connected between node 2426 and ground. An inductor 2428 is connected between node 2424 and node 2430. An inductor 2432 is connected between node 2426 and node 2430. A capacitor 2434 is connected between node 2430 and ground. Node 2430 is the voltage output node for $V_{OUT}$.

The power efficiencies of the switched power supply 2408 may be controlled in a number of fashions. A first manner involves controlling the dead times between the pairs of complementary switching transistors 2420 and 2422 and pair 2416 and 2418 in the manner described previously herein. An optimal dead time between the complementary switches may be selected as described herein below to order to improve the power efficiencies of the switched power supply 2408. Another manner for improving the power efficiencies of the switched power supply 2408 involves switching the operation of the switched power supply between a continuous conduction mode (CCM) and discontinuous conduction mode (DCM) based upon the direction of current flow through the inductors 2430 and 2432. When the current sensed at either of the $I_{SENSE1}$ output 2436 or the $I_{SENSE2}$ output 2438 indicates the current through either of the inductors 2428 or 2432 is beginning to flow in a negative direction from the $V_{OUT}$ node toward the nodes 2424 or 2426, the switched power supply 2408 will begin operating in a discontinuous conduction mode to limit the power inefficiencies caused by the current flow. Finally, the power efficiencies of the switched power circuitry 2408 may be controlled by the voltage $V_{DD}$ applied to the driver chips 2406 from the high speed voltage regulator 2410. A voltage of $V_{DD}$ may be selected such that gate losses and $R_{dson}$ losses are minimized as will be described herein below. Each of these may be controlled through a microprocessor associated with the DPWM.

Figure 25:
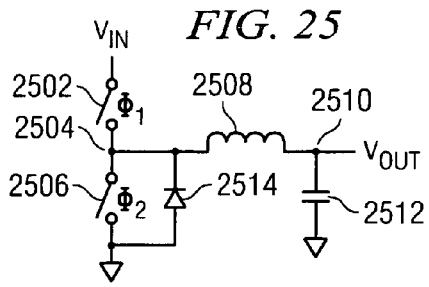
FIG. 25 is a schematic diagram of a power converter circuit including a body diode.

Referring now to FIG. 25, there is illustrated a portion of the switched power supply circuitry described previously wherein a first switch 2502 is connected between $V_{IN}$ and node 2504. The second switch 2506 is connected between node 2504 and ground. The switches 2502 and 2504 comprise transistor switches as described in FIG. 24. Switch 2502 is controlled by a control signal $\phi_1$ from the DPWM controller 2404 and switch 2506 is controlled by a switching signal $\phi_2$ from the DPWM controller 2504. An inductor 2508 is connected between node 2504 and a $V_{OUT}$ node 2510. A capacitor 2512 is connected between node 2510 and ground. A body diode 2514 will exist across the transistor switch 2506 between node 2504 and ground.

Figure 26:
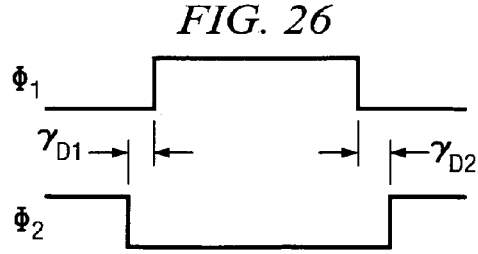
FIG. 26 is a timing diagram illustrating the dead time between the control signals of the circuit of FIG. 25.
Figure 27:
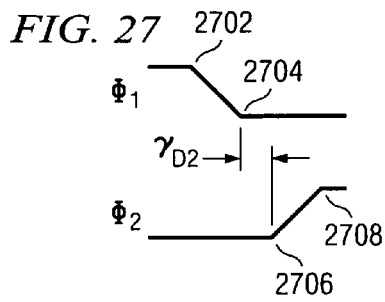
FIG. 27 is a timing diagram illustrating the effects of settling times on the dead time between the two control signals of FIG. 25.

Referring now to FIG. 26, there is illustrated a timing diagram for the control signals $\phi_1$ and $\phi_2$ for switches 2502 and 2506, respectively. When control signal $\phi_2$ goes low, a time period $\gamma_{D1}$ (the dead time) occurs prior to the time that the control signal $\phi_2$ goes high. Likewise, a dead time $\gamma_{D2}$ exists between the time period that the control signal $\phi_1$ goes low and the time that the control signal $\phi_2$ goes back high. While the timing diagram illustrated in FIG. 26 illustrates the edges of the control signals $\phi_1$ and $\phi_2$ going directly high or low at a singular point in time. FIG. 27 more accurately represents the manner in which the control signals $\phi_1$ and $\phi_2$ are switched on or off.

As can be seen in FIG. 27, the control signal $\phi_1$ begins to go low at a point 2702 and settles to the completely low state at point 2704. Likewise, the control signal $\phi_2$ begins to go high at point 2706 but does not completely enter the high state until point 2708. Thus, when the switches 2502 and 2506 are turning on and off, respectively, there are points wherein the switches are both partially on as one switch settles from the low state to the high state and the other switch settles from the high state to the low state. This can create conditions wherein the power efficiencies of the switched power supply 2408 are adversely affected. If switch 2502 and switch 2506 are both in the on state, at the same time, a shoot through current may occur from the $V_{IN}$ input of switch 2502 directly to ground. Likewise, diode conduction occurs through the body diode 2514 of switch 2506 when the voltage swings negative may cause losses when the switch 2506 is not fully turned on. Ideally, switch 2506 should be turned on when the input voltage applied to node 2504 is zero (i.e., switch 2502 is turned off). However, as was illustrated with respect to the discussion of FIG. 27, the turning off and on of the switches by their respective control signals $\phi_1$ and $\phi_2$ occurs over a period of time rather than a discrete point in time.

The optimal difference between the turn off point of one switch and the other switch such that the power losses due to the shoot through current or diode conduction are minimized may be programmed by altering the dead time between the switches. The dead time between the switches may be controlled in the manner described previously herein with respect to FIGS. 11 through 23. The ultimate goal is to select a dead time such that minimal power efficiency losses occur due to a loss in diode conduction through the body diode 2514 and due to a shoot through current from the input voltage to ground. This is more fully illustrated in FIG. 28.

Figure 28:
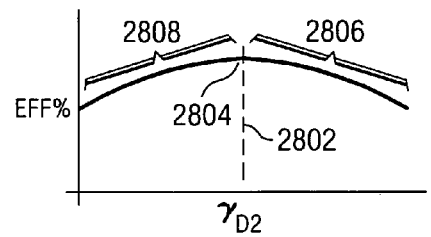
FIG. 28 illustrates the relationship between dead times and power efficiency for the circuit of FIG. 25.

FIG. 28 illustrates how differences in selection of a dead time may alter the power efficiencies of a switched power supply circuit. Line 2802 illustrates an optimal selection of a dead time wherein a power efficiency occurring at point 2804 is maximally achieved. If the dead time is increased to the portion of the curve indicated generally at 2806, power efficiencies of the switched power supply are reduced due to the losses occurring within the body diode 2514. Similarly, if the dead time is decreased to the area of the curve illustrated generally at 2808, the power efficiencies are decreased due to the shoot through current. Thus, by optimally adjusting the dead time occurring between complementary switches of a switched power supply, the power efficiencies of the circuit may be maximally controlled.

Referring now to FIG. 29, there is again illustrated a portion of a switched power supply circuit including the first switch 2902 connected between an input voltage $V_{IN}$ and a node 2904. A second switch 2906 is connected between node 2904 and ground. Each of these switches comprise switching transistors as described previously and are controlled by control signals $\phi_1$ and $\phi_2$, respectively. An inductor 2908 is connected between node 2904 and the $V_{OUT}$ node 2910. A capacitor 2912 is located between node 2910 and ground and is in parallel with a load resistance 2914 connected between node 2910 and ground. As the control signals $\phi_1$ and $\phi_2$ alternately switch the complementary switches 2902 and 2906 high and low, the output voltage across the load resistor $R_L$ will vary according to the equation $V_{OUT}=R_L \cdot di/dt$. Thus, the current I through the inductor 2908 will vary as illustrated in FIGS. 30a and 30b depending upon the value of the load resistor $R_L$.

Figure 30A:
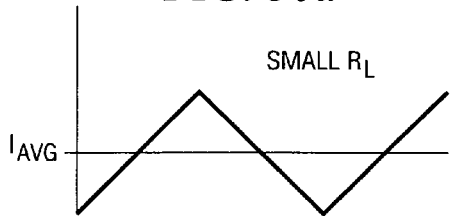
FIG. 30a is a current diagram of a low load circuit.

For a large or infinite value of $R_L$, the value of the current I through the inductor 2904 will vary as shown in FIG. 30a. In this case, the average current $I_{avg}$ is substantially equal to zero as the positive area under the current curve will be substantially equal to the negative area under the current curve. However, for low values of $R_L$, the average current $I_{avg}$ is substantially above zero because the entire current curve is shifted up responsive to the low value of $R_L$. In this case, the current curve remains positive and never equals zero and does not have a negative value as occurs when the current curve passes through zero going downward as illustrated in FIG. 30a.

Figure 29:
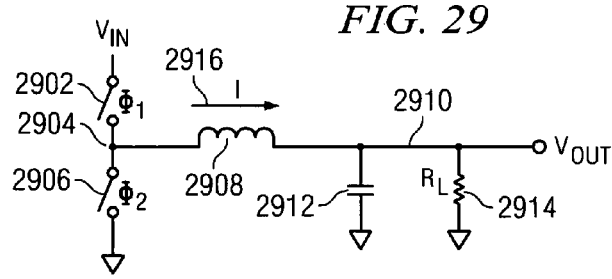
FIG. 29 is a schematic diagram of a power switching circuit including a load resistor.
Figure 30B:
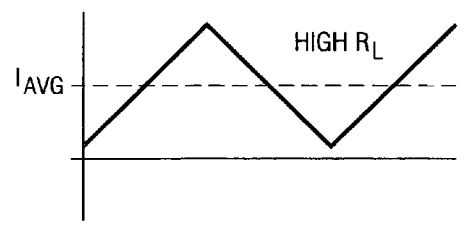
FIG. 30b is a current diagram of a high load circuit.
Figure 31:
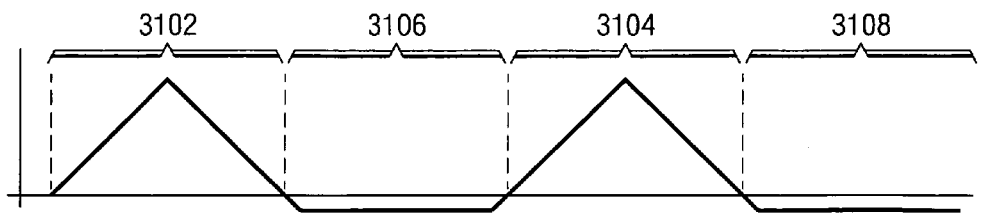
FIG. 31 is a current diagram of a circuit operating in a discontinuous conduction mode.

When the current curve goes negative, the current I flowing through the inductor 2908 becomes negative and flows in the opposite direction indicated by the arrow 2916 in FIG. 29. When the current goes negative, the power efficiencies of the switching power supply circuitry are greatly reduced. Thus, it is desirable to limit the occurrence of negative currents occurring for large values of the load resistance $R_L$. Thus, a current curve such as that illustrated in FIG. 31 is more desirable. For situations where the current curve is flowing in a positive direction such as indicated at 3102 and 3104 the current is fine. However, when the current crosses zero, the load switch 2906 should be turned off such that the current does not become substantially negative as indicated at 3106 and 3108. A current operating in this fashion is operating in a discontinuous conduction mode (DCM). A current operating in the manner illustrated in FIGS. 30a and 30b is operating in a continuous conduction mode (CCM). Thus, in order to improve the power efficiencies of a switched power supply circuit using the DPWM controller described herein above, the DPWM controller should control the switches of the switched power supply such that the switched power supply operates in a continuous conduction mode when a current is greater than zero (a low value of the load resistance $R_L$) and operates in a discontinuous conduction mode when the current goes negative indicating a large load resistance $R_L$.

Figure 32:
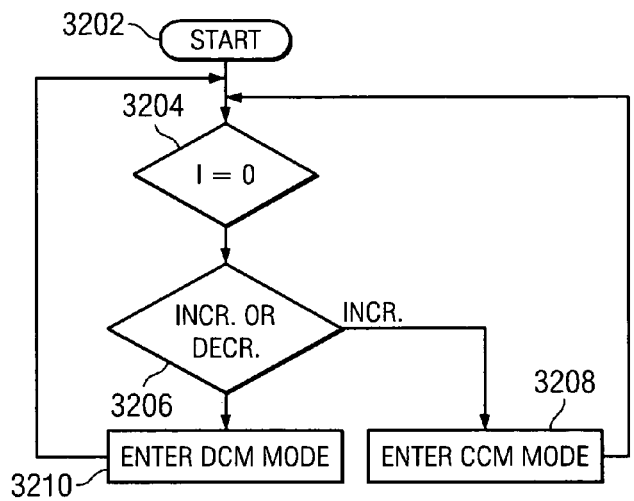
FIG. 32 is a flow diagram illustrating the manner in which a controller may switch between a discontinuous conduction mode and a continuous conduction mode responsive to the direction of current flow through the inductor of FIG. 29.

Referring now to FIG. 32, there is illustrated a flow diagram describing the process for controlling the operation of the switched power supply circuitry in either the continuous conduction mode or the discontinuous conduction mode in order to increase power efficiency of the circuitry. The process is initiated at step 3202. Inquiry step 3204 monitors for occurrence of a zero current crossing indicating the current curve passing through the zero point. The currents through the inductors may be monitored for zero crossings using the $I_{SENSE1}$ and $I_{SENSE0}$ outputs described in FIG. 24. Inquiry step 3206 determines if the current value is presently increasing or decreasing. If the current is increasing, the switched power supply circuitry is presently within the discontinuous conduction mode and the transistor switches of the switched power supply circuitry are controlled in a manner by the DPWM controller to place the switched power supply circuitry within the continuous conduction mode of operation at step 3208. Control then returns to inquiry step 3204 which monitors for the occurrence of a next zero crossing within the current. If inquiry step 3206 determines that the, current is decreasing, the switched power supply circuitry is presently operating within the continuous conduction mode of operation and the transistor switches of the switched power supply circuitry are controlled such that the switched power supply circuitry enters the discontinuous conduction mode of operation at step 3210. Control then returns to inquiry step 3204 to monitor for a next current zero crossing. Using this method, the switched power supply circuitry will operate within the discontinuous conduction mode during the large resistance load, negative current conditions that lower operating efficiencies of the switched power supply and operate in the continuous conduction mode during the positive current portions of high resistance loads $R_L$ or will maintain it within the continuous conduction mode when in low $R_L$ conditions.

Figure 33:
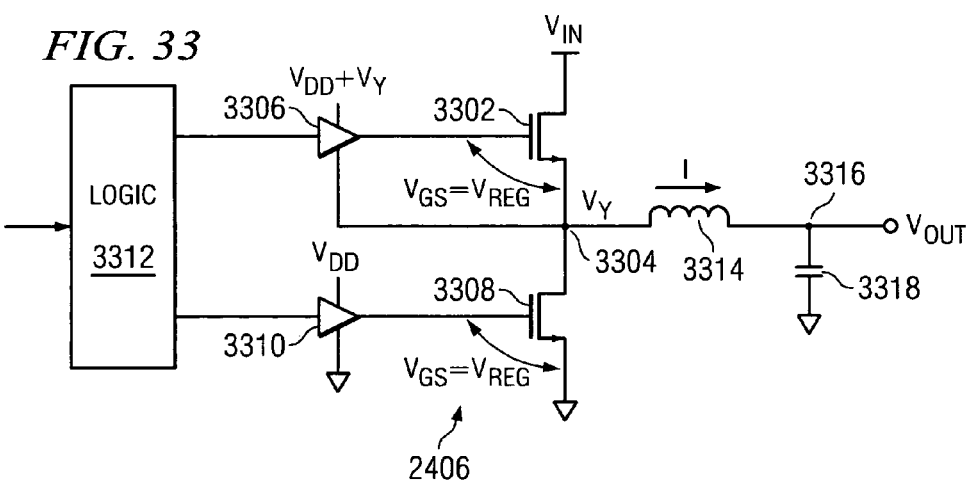
FIG. 33 is a schematic diagram of a switched power circuit including drivers at the input thereof.

Referring now to FIG. 33, there is illustrated the driver circuit 2406 connected to a switched power supply circuit consisting of a transistor switch 3302 having its source-drain path connected between the input voltage and anode 3304. The gate of transistor 3302 is connected to the output of driver 3308. The second switching transistor 3308 is connected between node 3304 and ground. The gate of transistor 3308 is connected to the output of driver circuit 3310. The inputs of driver circuits 3306 and 3310 are connected to the DPWM logic 3412 for receiving the switching control signals therefrom. An inductor 3414 is connected between node 3304 and an output node 3316. A capacitor 3318 is connected between node 3316 and ground. A number of power losses occur within the switched power supply circuit. These losses include the gate loss, and $R_{DS}$ losses. The gate loss may be defined according to the equation: gate loss=$\frac{1}{2}V_{GS}^2 \times C_{gate}$.

The $R_{DS}$ loss may be described according to the following equation:

$$R_{DSLOSS} = R_{DSON} \times I^2_{OUT} \times t.$$

wherein t equals time of the pulse width.

Figure 34:
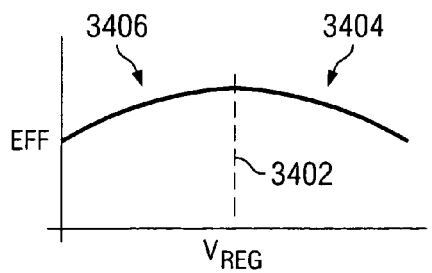
FIG. 34 illustrates the relationship between the provided regulated voltage $V_{REG}$ of the drivers of FIG. 33 and the efficiencies of the switch power supply.
Figure 35:
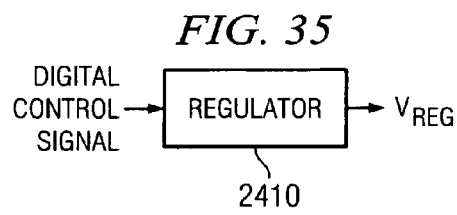
FIG. 35 illustrates a voltage regulator used to control the supply voltage to the drivers of the circuit of FIG. 33.

Thus, $V_{GS}$ is approximately equal to $1/R_{DS}$. The power efficiencies of the switched power supply may be adjusted by selecting an optimal value of the regulated voltage $V_{DD}$ that is applied to the driver circuits 3306 and 3310 such that the combined gate losses and $R_{DS}$ losses are minimized. This is more fully illustrated in FIG. 34. The efficiency of the switched power supply circuitry with respect to various levels of the established regulated voltage are illustrated by the curve in FIG. 34. The optimal regulated voltage $V_{REG}$ occurs at the point 3402. This is the regulated voltage at which the maximum power efficiency occurs. When the regulated voltage is increased, the switched power supply circuitry falls in the region 3404 of the curve wherein gate losses cause a decrease in the efficiency of the switched power supply circuitry. When the regulated voltage is decreased, the switched power supply circuitry moves into the region 3406 of the curve wherein the power efficiency is minimized due to Roson losses. Thus, the power efficiencies of the switched power supply circuitry may be established at the optimal point 3402 by controlling the regulated $V_{DD}$ voltage that is applied to the power inputs of the driver circuits 3306 and 3310. The $V_{DD}$ may be established such that the power supply circuitry operates at the optimal point 3402.

Thus, the power efficiency of the switched power supply circuitry may be controlled by controlling the regulated voltage $V_{REG}$ provided from a voltage regulator 2410. Responsive to a provided digital control signal input, the voltage regulator 2410 will generate a regulated voltage $V_{REG}$ that is provided to the driver circuits 3306, 3310 that are between the DPWM logic 3312 and a switched power supply circuit. The digital control signal would be generated by the DPWM logic or an associated microprocessor responsive to sensed voltage and current signals from the output of the switched power supply circuitry.

Thus, using any of the above-described techniques or a combination thereof, the operating power efficiency of a switched power supply circuit may be controlled Using the described DPWM controller, the power efficiencies maybe optimized by controlling the dead times between complementary switching transistors of the switched power supply circuitry, controlling the regulated voltage applied to the driver circuitry connected between the DPWM controller and switched power supply transistors and by switching the switched power supply circuitry between continuous conduction mode and discontinuous conduction mode responsive to the sensed current flow through inductors of the switched power supply circuitry.

Although the preferred embodiment has been described in detail, it should be understood that various changes, substitutions and alterations can be made therein without departing from the scope of the invention as defined by the appended claims.

What is claimed is:

1. A system for optimizing power efficiency of a switching power converter operating at a switching frequency, comprising:
   a digital controller for receiving an analog signal representing an output DC voltage of the switching power converter for comparison to a desired output voltage level and generating switching control signals to control the operation of the power supply to regulate the output DC voltage to said desired output voltage, at least two of the switching control signals having a dead time between a first edge of a first control signal and a second edge of a second control signal, wherein the dead time is programmable to control a power efficiency of the switching power converter, the switching control signals switching the switching power supply between a continuous conduction mode and a discontinuous conduction mode responsive to a mode control signal, the operation of the digital controller parameterized by a set of operating parameters;
   a driver circuit connected to an output of the digital controller to drive the switching control signals and having an input for a regulated voltage;
   a voltage regulator for selecting the regulated voltage to the driver circuit responsive to a voltage control signal; and
   a micro controller for determining the parameters used by said digital controller, for establishing the programmable dead time between the control signals to substantially maximize the power efficiency of the switching power converter, for generating the voltage control signal to substantially maximize the power efficiency of the switching power converter and for generating the mode control signal responsive to a current signal from the switching power converter, said micro controller operating independent of the operation of the digital controller.

2. The system of claim 1, wherein the digital controller and the driver circuit are included within a monolithic integrated circuit.

3. The system of claim 2, wherein the voltage regulator is further included within the monolithic integrated circuit.

4. The system of claim 1, wherein the micro controller generates the mode control signal to switch the switching power converter to the discontinuous conduction mode when the current signal indicates a negative current in the switching power converter and generates the mode control signal to switch the switching power converter to the continuous conduction mode when the current signal indicates a positive current in the switching power converter.

5. The system of claim 1, wherein the established programmable dead time minimizes power losses due to shoot through current and diode conduction.

6. The system of claim 1, wherein the voltage control signal minimizes power losses due to combined Rds losses and gate losses in transistor switches of the switching power converter.

7. The system of claim 1, wherein the digital controller comprises a state machine that is operable to generate the first control signal responsive to a duty cycle function indicating a number of clock cycles from a point in time at which the first edge occurs and to generate the second edge of the second control signal responsive to the duty cycle function plus a selected offset indicating a second number clock cycles from the point in time at which the second edge occurs.

8. The system of claim 7, wherein the state machine is register driven from information contained in a plurality of registers, with the contents of said registers comprising said operating parameters for generating the first control signal and the second control signal, which said registers are controlled by said micro controller.

* * * * *